United States Patent
Udagawa et al.

(10) Patent No.: US 9,197,057 B2
(45) Date of Patent: Nov. 24, 2015

(54) MAGNETIZING INRUSH CURRENT SUPPRESSION APPARATUS

(71) Applicant: KABUSHIKI KAISHA TOSHIBA, Minato-ku, Tokyo (JP)

(72) Inventors: Keisuke Udagawa, Urayasu (JP); Tadashi Koshizuka, Saitama (JP); Shiro Maruyama, Yokohama (JP); Minoru Saitoh, Kamakura (JP); Noriyuki Nagayama, Tokorozawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 477 days.

(21) Appl. No.: 13/773,372

(22) Filed: Feb. 21, 2013

(65) Prior Publication Data

US 2013/0163125 A1    Jun. 27, 2013

Related U.S. Application Data

(63) Continuation of application No. PCT/JP2011/068873, filed on Aug. 22, 2011.

(30) Foreign Application Priority Data

Aug. 23, 2010    (JP) .................. 2010-186316

(51) Int. Cl.
*H02H 7/04* (2006.01)
*H01H 9/56* (2006.01)
*H01H 33/59* (2006.01)
(Continued)

(52) U.S. Cl.
CPC ............. *H02H 7/04* (2013.01); *H01H 9/563* (2013.01); *H01H 33/593* (2013.01); *H02H 9/002* (2013.01)

(58) Field of Classification Search
USPC ........................................... 307/415
See application file for complete search history.

(56) References Cited

U.S. PATENT DOCUMENTS 8,310,106 B2    11/2012    Koshiduka et al.
2009/0134862 A1    5/2009    Kinoshita et al.
(Continued)

FOREIGN PATENT DOCUMENTS

CN    101447664 A    6/2009
JP    3-132436 A    6/1991
(Continued)

OTHER PUBLICATIONS

International Search Report (ISR) dated Sep. 20, 2011 (and English translation thereof) issued in parent International Application No. PCT/JP2011/068873.

(Continued)

*Primary Examiner* — Robert Deberadinis
(74) *Attorney, Agent, or Firm* — Holtz, Holtz, Goodman & Chick PC

(57) ABSTRACT

According to one embodiment, there is provided a magnetizing inrush current suppression apparatus including an interrupting phase detection unit that detects a phase when the transformer that converts a three-phase alternating-current voltage to a single-phase alternating-current voltage is disconnected, a single-phase alternating-current voltage measurement unit that measures the single-phase alternating-current voltage on the power system side of the circuit breaker, and a closing unit that closes the circuit breaker in the detected phase, based on the measured single-phase alternating-current voltage.

18 Claims, 18 Drawing Sheets

(51) Int. Cl.
*H02H 9/00* (2006.01)
*G11C 13/02* (2006.01)

(56) References Cited

U.S. PATENT DOCUMENTS

| 2010/0039737 A1 | 2/2010 | Koshizuka et al. |
| 2011/0181989 A1 | 7/2011 | Udagawa et al. |

FOREIGN PATENT DOCUMENTS

| JP | 2002-075145 A | 3/2002 |
| JP | 2004-088834 | 3/2004 |
| JP | 2004-153932 | 5/2004 |
| JP | WO 2008/065757 A1 | 6/2008 |
| JP | 2008-160100 | 7/2008 |
| JP | 2010-004686 | 1/2010 |
| JP | 2011-154974 | 8/2011 |

OTHER PUBLICATIONS

John J. Brunke et al.: "Elimination of Transformer Inrush Currents by Controlled Switching—Part I: Theoretical Considerations": IEEE Transactions on Power Delivery: vol. 16, No. 2: Apr. 2001: pp. 276-280 (in English).

International Preliminary Report on Patentability (in English); dated Mar. 28, 2013; issued in International application No. PCT/JP2011/068873.

Chinese Office Action dated Jul. 21, 2014 in counterpart Chinese Application No. 201180026788.8.

Extended European Search Report dated Jul. 3, 2014 issued in counterpart European Application No. 11819886.0.

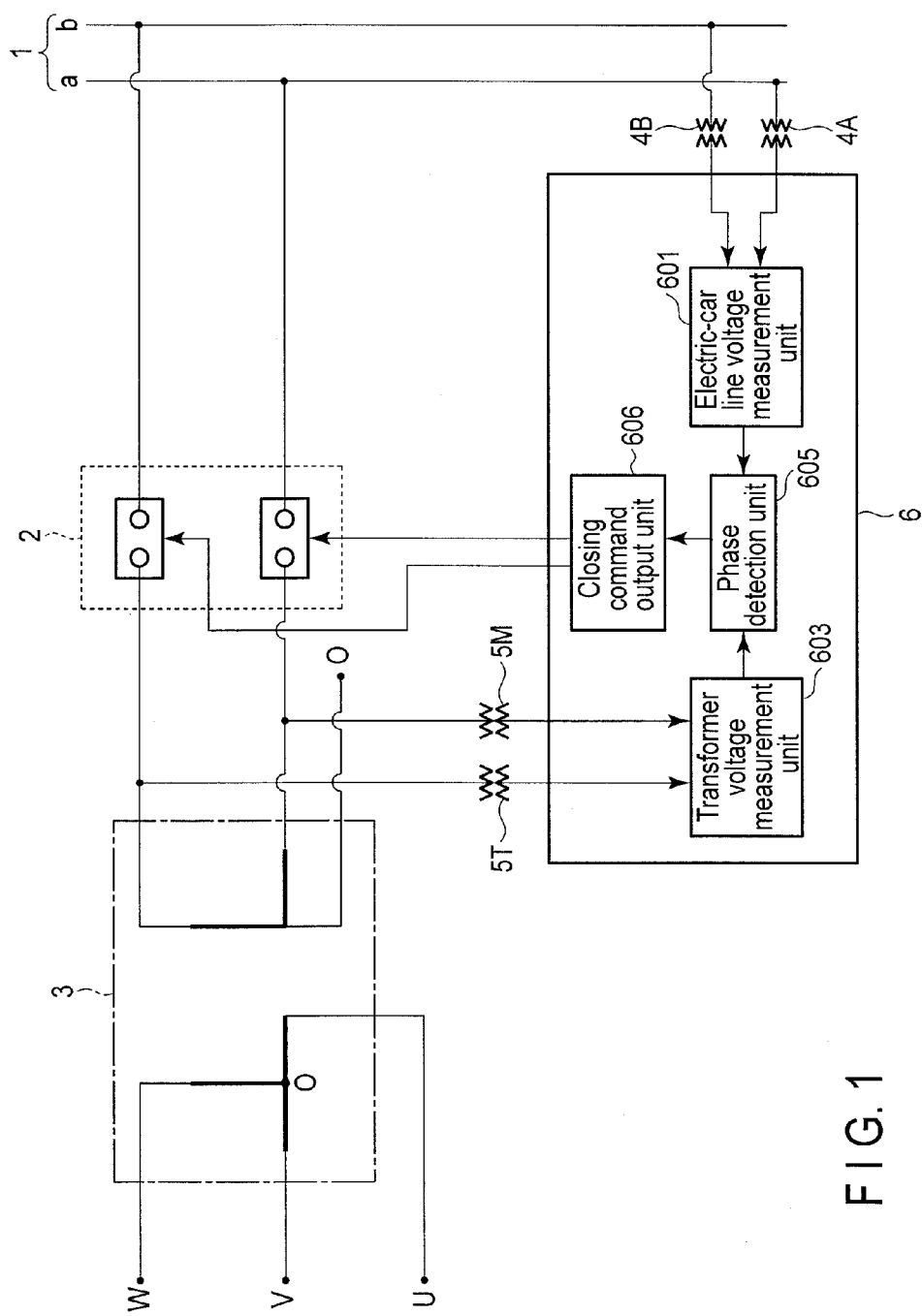
F I G. 1

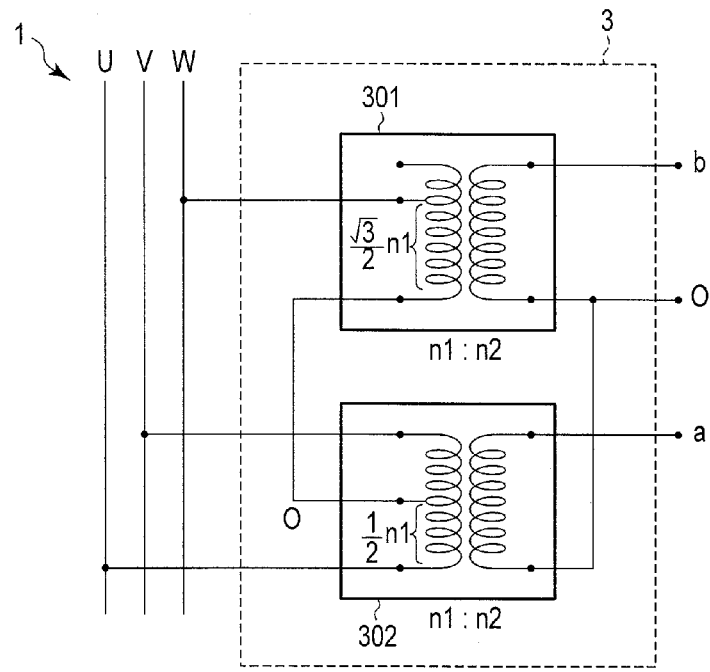
F I G. 2
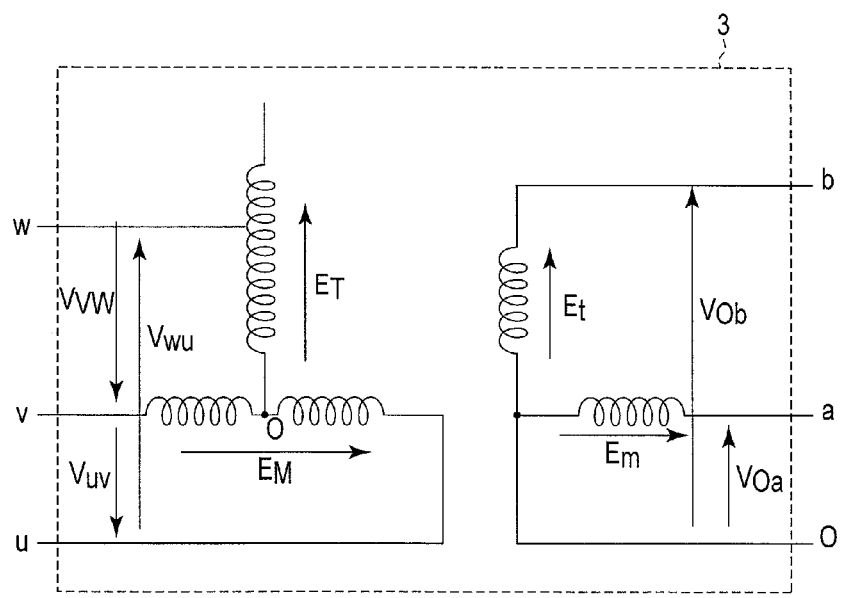
F I G. 3

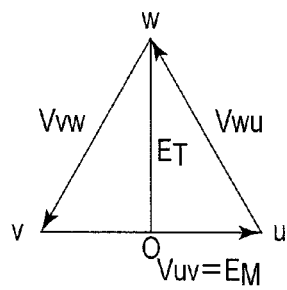
F I G. 4
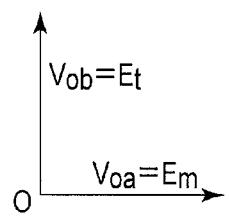
F I G. 5
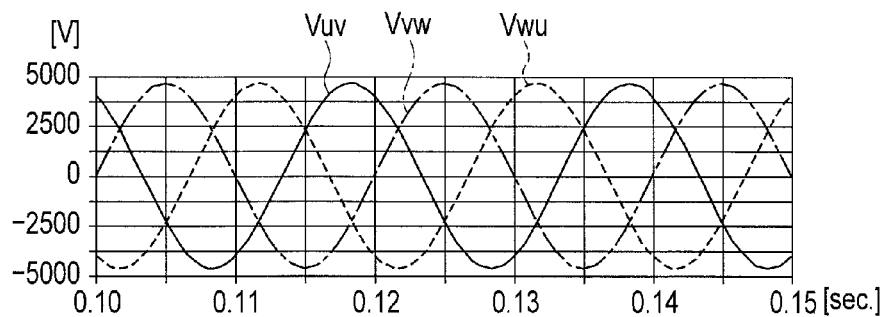
F I G. 6

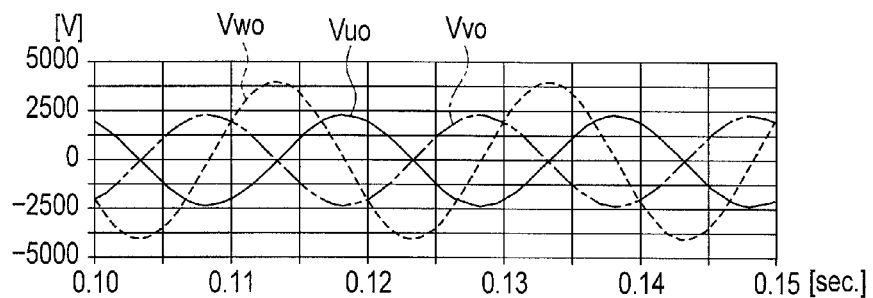
F I G. 7
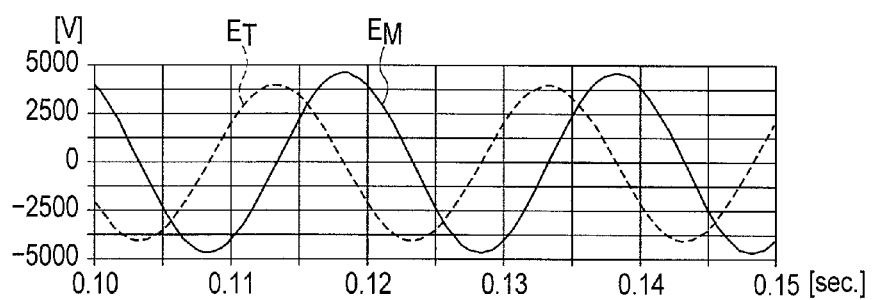
F I G. 8
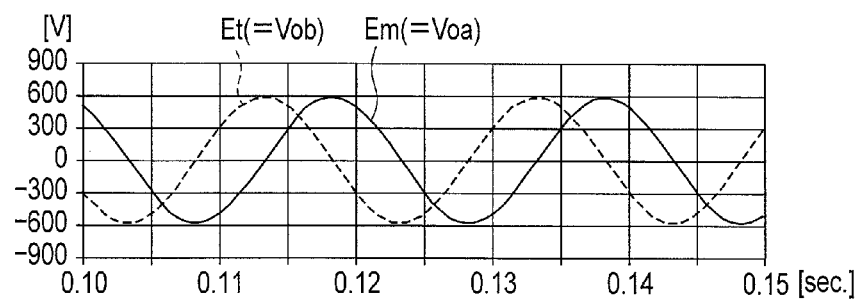
F I G. 9

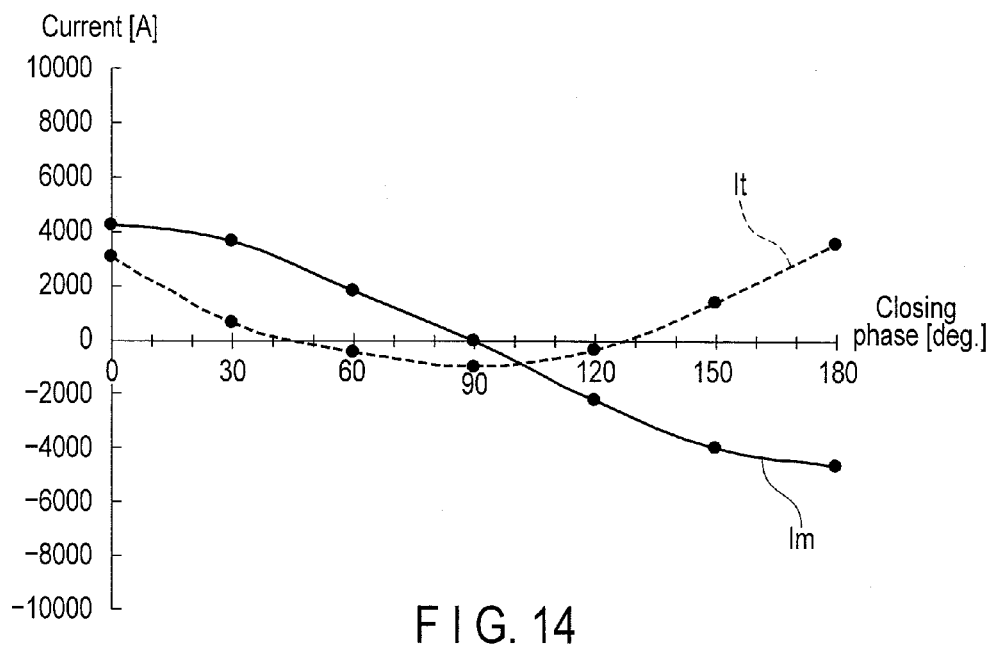
F I G. 14
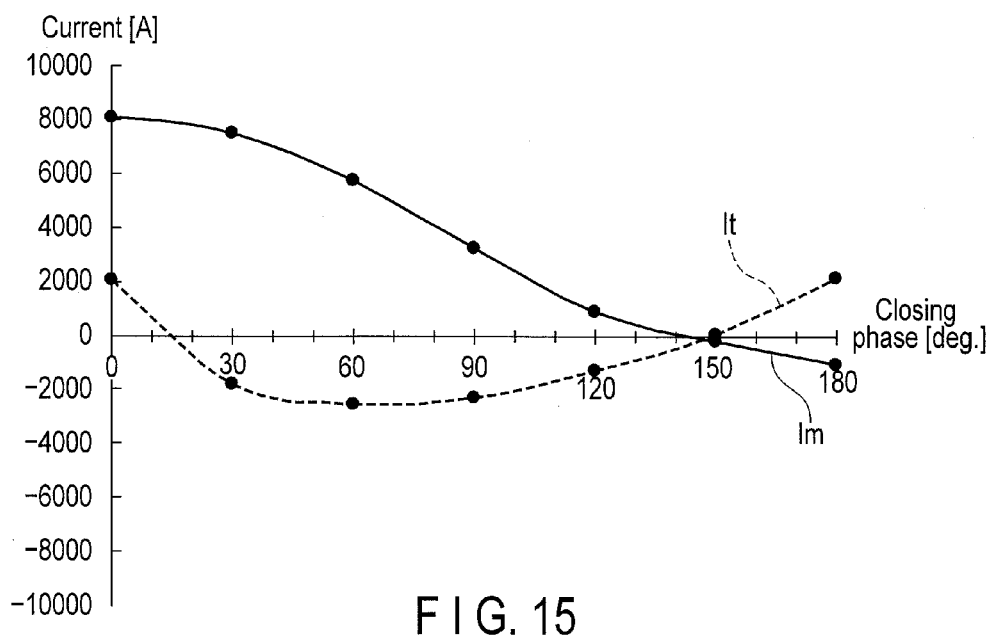
F I G. 15

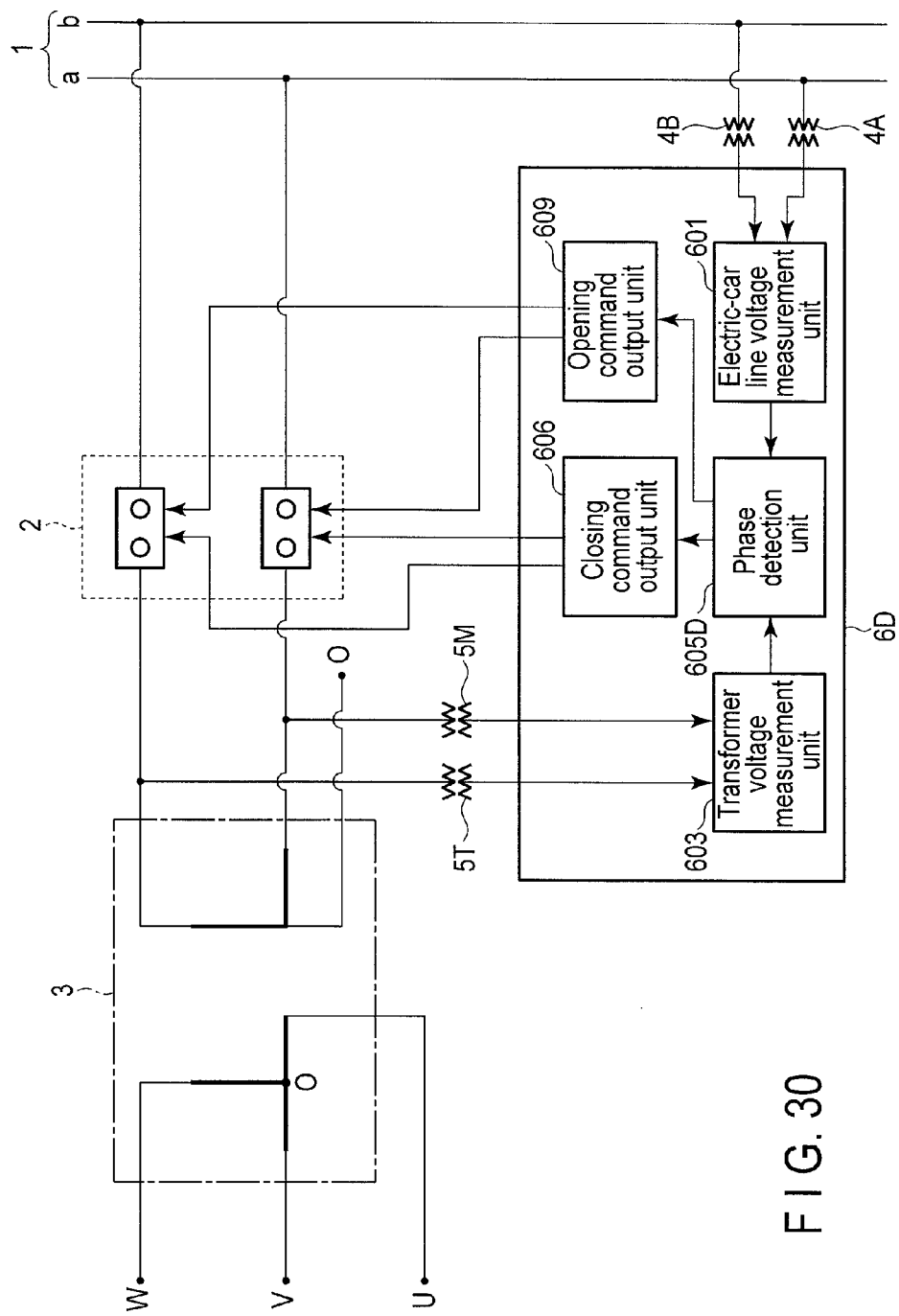
F I G. 30

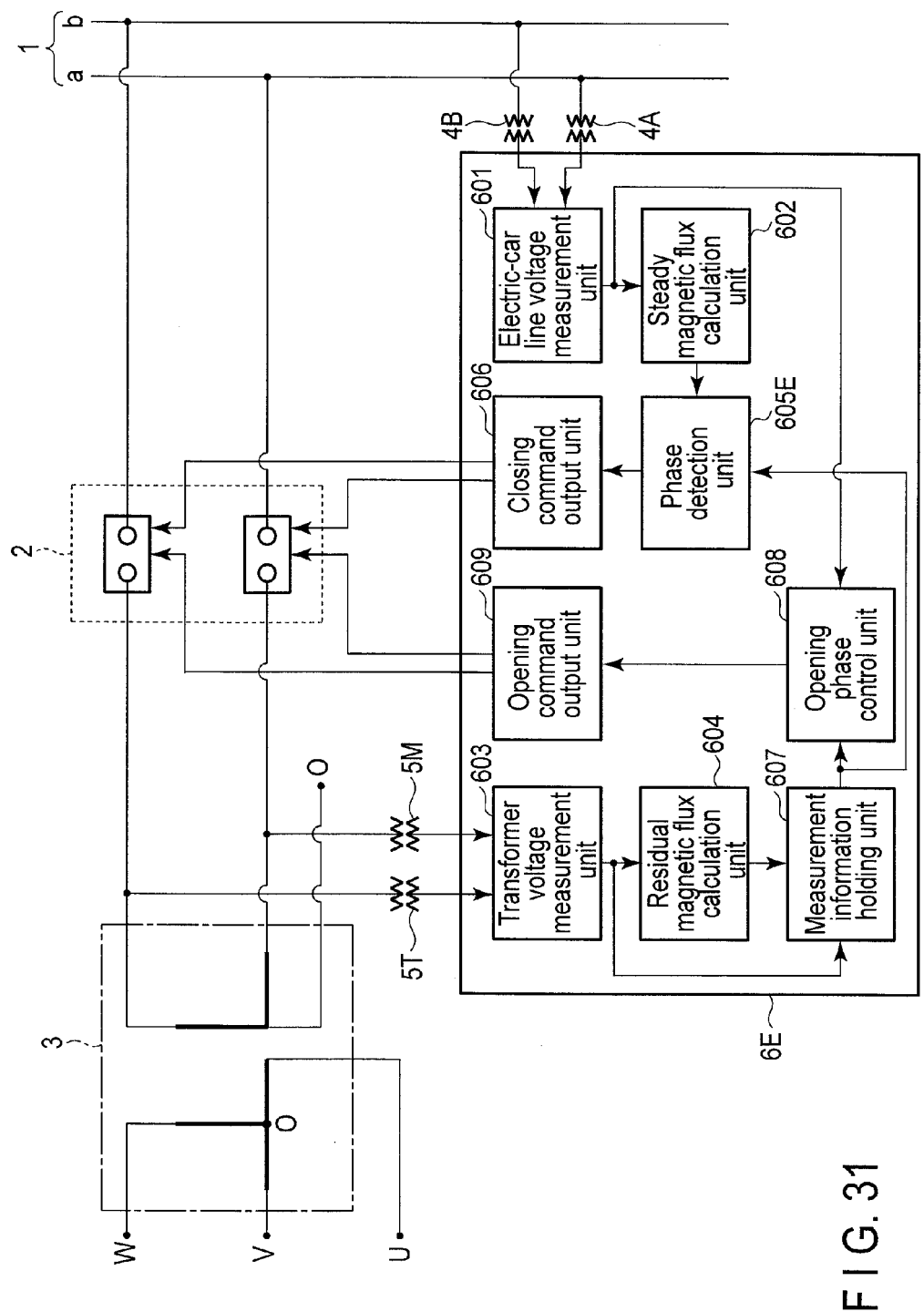
F I G. 31

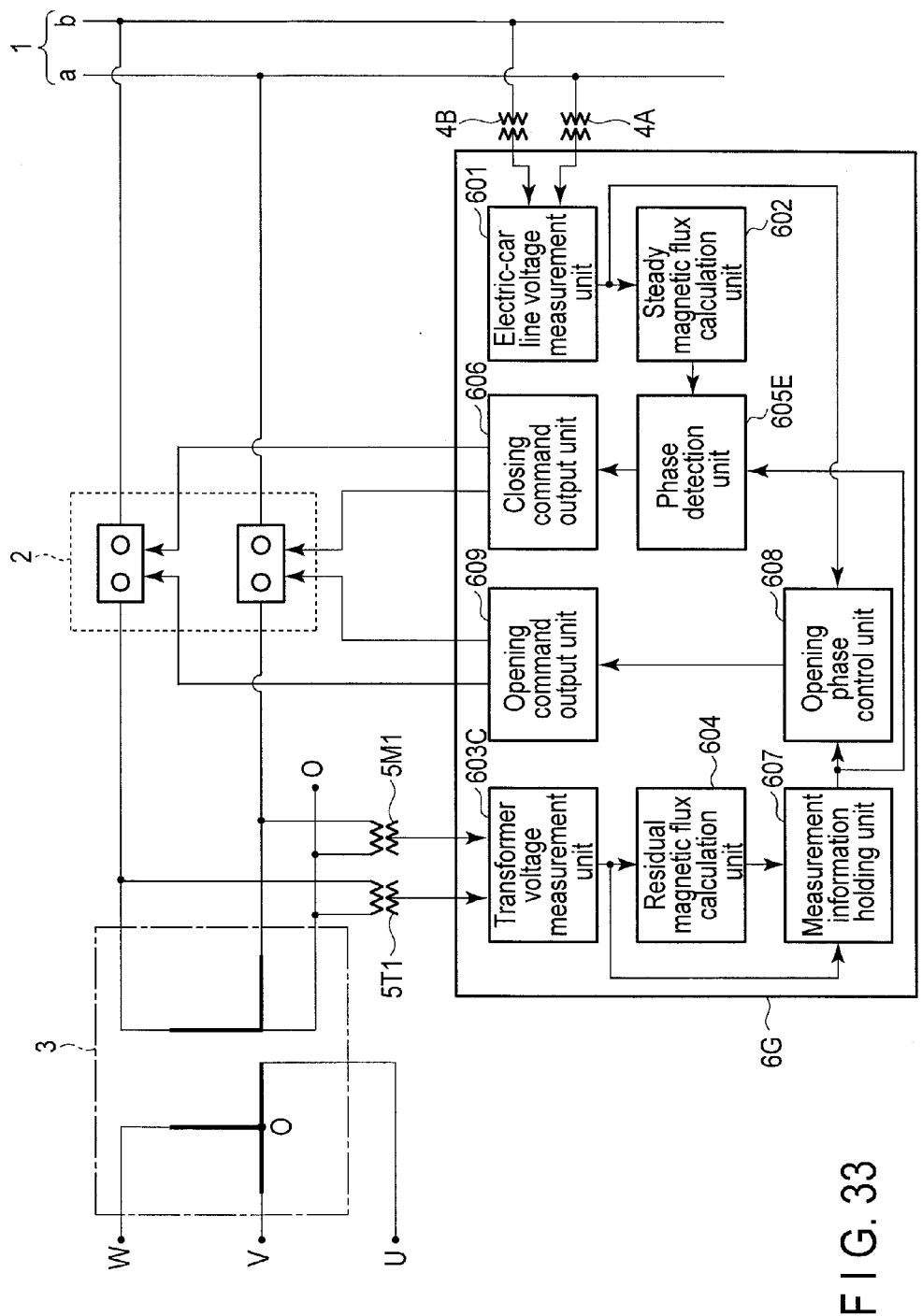
F I G. 33

US 9,197,057 B2

MAGNETIZING INRUSH CURRENT SUPPRESSION APPARATUS

CROSS REFERENCE TO RELATED APPLICATIONS

This application is a Continuation Application of PCT Application No. PCT/JP2011/068873, filed Aug. 22, 2011 and based upon and claiming the benefit of priority from Japanese Patent Application No. 2010-186316, filed Aug. 23, 2010, the entire contents of all of which are incorporated herein by reference.

FIELD

Embodiments described herein relate generally to a magnetizing inrush current suppression apparatus that suppresses a magnetizing inrush current generated when a circuit breaker is closed.

BACKGROUND

In general, it is known that when a transformer is energized without any load by being connected to a power source in a state where a residual magnetic flux is present in an iron core of a transformer, a large magnetizing inrush current flows. A size of this magnetizing inrush current is several times as large as a rated load current of the transformer. When such a large magnetizing inrush current flows, a system voltage fluctuates, and when the voltage fluctuation is large, a customer is influenced sometimes.

Consequently, it is known that as a method of suppressing the magnetizing inrush current, there is used a circuit breaker with a resistor in which a closing resistance and a contact are connected in series. The circuit breaker with the resistor is connected in parallel with a main contact of the circuit breaker. The circuit breaker with the resistor is closed prior to the main contact of the circuit breaker. Consequently, the magnetizing inrush current is suppressed.

Moreover, as another suppression method, there is known a method in which when a direct grounding system three-phase transformer is energized by three single-phase type circuit breakers, an optional circuit breaker for one phase is precedently closed, and then the remaining circuit breakers for the two phases are closed to suppress a magnetizing inrush current.

Furthermore, it is known that as a method of suppressing a magnetizing inrush current at a time when a non-effective grounding system three-phase transformer is energized by a three-phase collective operation type circuit breaker, a value of a magnetic flux remaining in an iron core at a time when the transformer is disconnected is measured, and a phase to be closed of the circuit breaker is controlled to suppress the magnetizing inrush current at a time when the transformer is energized.

On the other hand, as a method of converting a three-phase alternating-current voltage to single-phase alternating-current voltages, a Scott connection, a Woodbridge connection transformer, a modified Woodbridge connection and the like are known. These connection transformers are used, for example, when a power is supplied to a single-phase electric furnace, a single-phase alternating-current electric car, or the like.

However, the above-mentioned magnetizing inrush current suppression methods have the following problems.

In the magnetizing inrush current suppression method by the circuit breaker with the resistor, it is necessary to add the circuit breaker with the resistor to a usual circuit breaker, and hence the whole size of the circuit breaker increases.

Moreover, in any of the magnetizing inrush current suppression methods, it is not predicted that the above-mentioned transformer which converts the three-phase alternating-current voltage to the single-phase alternating-current voltage is introduced.

For example, in the method in which the residual magnetic flux is measured to control the phase to be closed of the circuit breaker, a control method for the three-phase transformer which is to be used in a power system cannot be applied, as it is, to the transformer which converts the three-phase alternating-current voltage to the single-phase alternating-current voltage. This is because in these connection transformers, even when a primary-side or secondary-side voltage is measured, the magnetic flux of the iron core of the transformer cannot be calculated as it is.

BRIEF DESCRIPTION OF THE DRAWINGS

FIG. 1 is a block diagram showing a structure of a power system to which a magnetizing inrush current suppression apparatus according to a first embodiment of the invention is applied;

FIG. 2 is a block diagram showing a structure of a Scott connection transformer according to the first embodiment;

FIG. 3 is a circuit diagram showing a position of a voltage vector in the Scott connection transformer according to the first embodiment;

FIG. 4 is a vector diagram showing a voltage vector of a primary side of the Scott connection transformer according to the first embodiment;

FIG. 5 is a vector diagram showing a voltage vector of a secondary side of the Scott connection transformer according to the first embodiment;

FIG. 6 is a waveform diagram showing voltage waveforms of primary line voltages of the Scott connection transformer according to the first embodiment;

FIG. 7 is a waveform diagram showing voltage waveforms of primary winding voltages with respect to a midpoint of the Scott connection transformer according to the first embodiment;

FIG. 8 is a waveform diagram showing voltage waveforms of primary winding voltages of the Scott connection transformer according to the first embodiment;

FIG. 9 is a waveform diagram showing voltage waveforms of secondary winding voltages of the Scott connection transformer according to the first embodiment;

FIG. 14 is a graph showing the magnetizing inrush currents flowing through the circuit breaker in accordance with a relation between a interrupting phase of 90 degrees and the closing phase in the Scott connection transformer according to the first embodiment;

FIG. 15 is a graph showing the magnetizing inrush currents flowing through the circuit breaker in accordance with a relation between a interrupting phase of 150 degrees and the closing phase in the Scott connection transformer according to the first embodiment;

FIG. 30 is a block diagram showing a structure of a power system to which a magnetizing inrush current suppression apparatus according to a fifth embodiment of the invention is applied;

FIG. 31 is a block diagram showing a structure of a power system to which a magnetizing inrush current suppression apparatus according to a sixth embodiment of the invention is applied;

FIG. 33 is a block diagram showing a structure of a power system to which a magnetizing inrush current suppression apparatus according to an eighth embodiment of the invention is applied.

DETAILED DESCRIPTION

Figure 10:
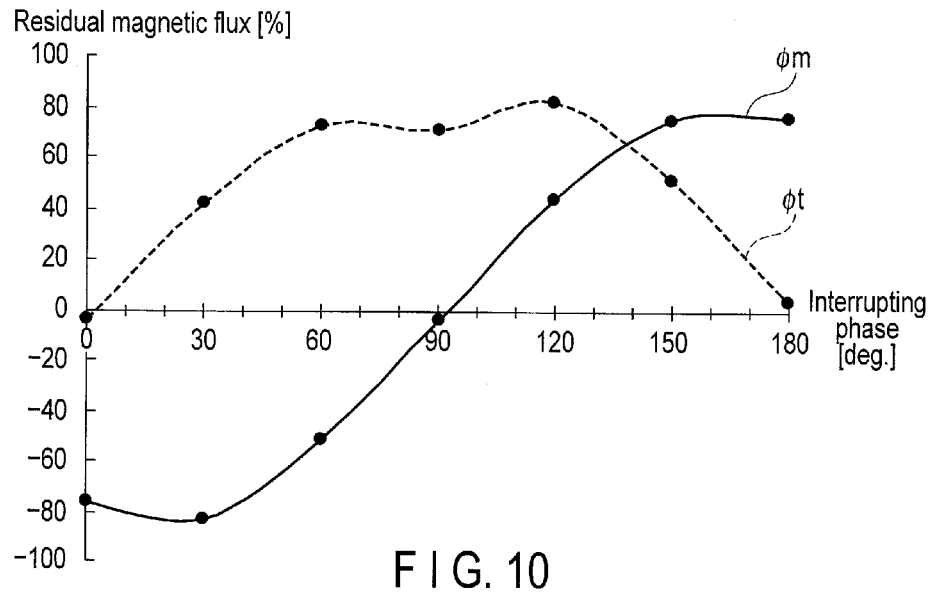
FIG. 10 is a waveform diagram showing secondary-side residual magnetic fluxes when the Scott connection transformer is disconnected by a circuit breaker according to the first embodiment.

Hereinafter, embodiments of the invention will be described with reference to the drawings.

In general, according to one embodiment, there is provided a magnetizing inrush current suppression apparatus that suppresses a magnetizing inrush current generated when there is closed a circuit breaker to open and close a connection between a single-phase alternating-current power system and a transformer that converts a three-phase alternating-current voltage to a single-phase alternating-current voltage. The magnetizing inrush current suppression apparatus includes an interrupting phase detection unit configured to detect a phase when the transformer is disconnected by the circuit breaker; a single-phase alternating-current voltage measurement unit configured to measure the single-phase alternating-current voltage on the power system side of the circuit breaker; and a closing unit configured to close the circuit breaker in the phase detected by the interrupting phase detection unit, based on the single-phase alternating-current voltage measured by the single-phase alternating-current voltage measurement unit.

First Embodiment

FIG. 1 is a block diagram showing a structure of a power system to which a magnetizing inrush current suppression apparatus 6 according to a first embodiment of the invention is applied. It is to be noted that the same parts in the subsequent drawings are denoted with the same reference marks, detailed descriptions thereof are omitted, and different parts will mainly be described. Also in the subsequent embodiments, repeated descriptions are similarly omitted.

The power system according to the present embodiment includes an electric-car line 1, a circuit breaker 2, a Scott connection transformer 3, electric-car line voltage detectors 4A and 4B for two phases which are disposed in the electric-car line 1, transformer secondary voltage detectors 5M and 5T for two phases which are disposed on a secondary side (the electric-car line 1 side) of the Scott connection transformer 3, and the magnetizing inrush current suppression apparatus 6.

The electric-car line 1 is a single-phase alternating-current power system constituted of an A-phase and a B-phase. The electric-car line 1 is, for example, a trolley line. A single-phase alternating-current power is supplied to the electric-car line 1 through the Scott connection transformer 3 or a transformer of another substation. The Scott connection transformer 3 or the transformer of the other substation converts, to the single-phase alternating-current power, a three-phase alternating-current power supplied through a bus (the power source bus) of a three-phase alternating-current power system.

The Scott connection transformer 3 is connected to the electric-car line 1 via the circuit breaker 2. The Scott connection transformer 3 is disposed in an effective grounding system or a non-effective grounding system. The Scott connection transformer 3 converts, to two sets of single-phase alternating-current voltages, a three-phase alternating-current voltage supplied through the power source bus. The Scott connection transformer 3 supplies the converted two sets of single-phase alternating-current voltages to the A-phase and B-phase of the electric-car line 1 via the circuit breaker 2, respectively. In the Scott connection transformer 3, a three-phase alternating-current side is a primary side, and a single-phase alternating-current side is the secondary side.

The circuit breaker 2 is interposed between the electric-car line 1 and the Scott connection transformer 3. The circuit breaker 2 is an each-phase operation type circuit breaker which individually operates the A-phase and the B-phase. When the electric-car line 1 is charged, the circuit breaker 2 is closed, whereby the Scott connection transformer 3 is energized by the electric-car line 1. When the circuit breaker 2 is opened, the Scott connection transformer 3 is disconnected from the electric-car line 1.

The two electric-car line voltage detectors 4A and 4B are measuring instruments to measure voltages on the secondary side (the electric-car line 1 side) of the circuit breaker 2. The electric-car line voltage detectors 4A and 4B measure phase voltages (the voltages to ground) of the A-phase and B-phase of the electric-car line 1, respectively. Each of the electric-car line voltage detectors 4A and 4B is, for example, an instrument transformer (voltage transformer [VT]). The electric-car line voltage detectors 4A and 4B output detected values as detection signals to the magnetizing inrush current suppression apparatus 6.

The two transformer secondary voltage detectors 5M and 5T are measuring instruments to measure voltages on the primary side (the Scott connection transformer 3 side) of the circuit breaker 2. The transformer secondary voltage detectors 5M and 5T measure the respective secondary voltages of the Scott connection transformer 3 (the voltages to ground of the respective phases (a main phase and a T-phase) of the secondary side). Each of the transformer secondary voltage detectors 5M and 5T is, for example, an instrument transformer (voltage transformer [VT]). The transformer secondary voltage detectors 5M and 5T output detected values as detection signals to the magnetizing inrush current suppression apparatus 6.

The magnetizing inrush current suppression apparatus 6 outputs a closing command to a main contact of each phase of the circuit breaker 2 based on the detection signals received from the electric-car line voltage detectors 4A and 4B and the transformer secondary voltage detectors 5M and 5T, respectively. Consequently, each phase of the circuit breaker 2 is closed.

FIG. 2 is a block diagram showing a structure of the Scott connection transformer 3 according to the present embodiment.

The Scott connection transformer 3 is constituted of two single-phase transformers of an M-phase transformer (a main transformer) 302 and a teaser transformer 301. Both terminals of a primary winding of the M-phase transformer 302 are connected to a U-phase and a V-phase, respectively. The M-phase transformer 302 connects a portion (a midpoint O) of ½ (0.5) of the primary winding to one end of a primary winding of the teaser transformer 301. The teaser transformer 301 connects, to a W-phase of the power source bus 1, a tap where a voltage becomes 0.866 (√3/2) p.u. when the U-phase and V-phase of the power source bus 1 are connected to both the terminals of the primary winding of the M-phase transformer 302.

FIG. 3 to FIG. 5 are views for explaining a voltage vector in the Scott connection transformer 3 according to the present embodiment. FIG. 3 is a circuit diagram showing a position of the voltage vector in the Scott connection transformer 3. FIG. 4 is a vector diagram showing a primary voltage vector of the Scott connection transformer 3. FIG. 5 is a vector diagram showing a secondary voltage vector of the Scott connection transformer 3.

In the Scott connection transformer 3, two single-phase transformers of a primary rated voltage of 3300 volts and a secondary rated voltage of 415 volts are connected via the Scott connection.

FIG. 6 to FIG. 9 are waveform diagrams showing voltage waveforms in the Scott connection transformer 3 according to the present embodiment. FIG. 6 shows voltage waveforms of primary line voltages Vuv, Vvw and Vwu. FIG. 7 shows voltage waveforms of primary winding voltages Vuo, Vvo and Vwo by use of the midpoint O as a reference. FIG. 8 shows voltage waveforms of primary winding voltages EM and ET. FIG. 9 shows voltage waveforms of secondary winding voltages Em and Et.

In the drawings, the voltage Vuv shows a line voltage between the U-phase and the V-phase on the primary side of the Scott connection transformer 3, the voltage Vvw shows a line voltage between the V-phase and the W-phase on the primary side of the Scott connection transformer 3, and the voltage Vwu shows a line voltage between the W-phase and the U-phase on the primary side of the Scott connection transformer 3. The voltage ET shows a primary winding voltage of the teaser transformer 301, and the voltage EM shows a primary winding voltage of the M-phase transformer 302. The voltage Et shows a secondary winding voltage of the teaser transformer 301, and the voltage Em shows a secondary winding voltage of the M-phase transformer 302. The voltage Vuo shows a primary winding voltage between the midpoint O and the U-phase, the voltage Vvo shows a primary winding voltage between the midpoint O and the V-phase, and the voltage Vwo shows a primary winding voltage between the midpoint O and the W-phase, respectively.

The line voltage Vuv between the U-phase and the V-phase and the primary winding voltage EM of the M-phase transformer 302 become the same phase. The primary winding voltage ET of the teaser transformer 301 advances as much as a phase of 90 degrees from the primary winding voltage EM of the M-phase transformer 302. Consequently, the secondary winding voltage Et of the teaser transformer 301 advances as much as the phase of 90 degrees from the secondary winding voltage Em of the M-phase transformer 302.

Two sets of single-phase alternating-current voltages Em and Et of the Scott connection transformer 3 are applied across a-o terminals and b-o terminals. The secondary winding voltage Em of the M-phase transformer 302 is output from between the a-o terminals (the A-phase). The secondary winding voltage Et of the teaser transformer 301 is output from between the b-o terminals (the B-phase).

A structure of the magnetizing inrush current suppression apparatus 6 will be described with reference to FIG. 1.

The magnetizing inrush current suppression apparatus 6 includes an electric-car line voltage measurement unit 601, a transformer voltage measurement unit 603, a phase detection unit 605, and a closing command output unit 606.

The electric-car line voltage measurement unit 601 measures the respective phase voltages of the electric-car line 1 based on the detection signals detected by the electric-car line voltage detectors 4A and 4B. The electric-car line voltage measurement unit 601 outputs the measured phase voltages of the electric-car line 1 to the phase detection unit 605.

The transformer voltage measurement unit 603 measures the respective secondary voltages of the Scott connection transformer 3 based on the detection signals detected by the transformer secondary voltage detectors 5M and 5T. The transformer voltage measurement unit 603 outputs the measured secondary voltages to the phase detection unit 605.

The phase detection unit 605 monitors the respective phase voltages of the electric-car line 1 which are measured by the electric-car line voltage measurement unit 601, and the respective secondary voltages of the Scott connection transformer 3 which are measured by the transformer voltage measurement unit 603, whereby a interrupting phase when the circuit breaker 2 is finally opened is stored. The phase detection unit 605 detects the same phase as the stored interrupting phase based on the respective phase voltages of the electric-car line 1 which are measured by the electric-car line voltage measurement unit 601. The phase detection unit 605 outputs the detected phase to the closing command output unit 606.

The closing command output unit 606 outputs a closing command to an operation mechanism which drives the main contact of each phase of the circuit breaker 2 in the phase detected by the phase detection unit 605 as a closing phase. Consequently, the circuit breaker 2 is closed.

The closing phase of the inrush current suppression apparatus 6 will be described with reference to FIG. 10 to FIG. 15.

FIG. 10 is a waveform diagram showing secondary residual magnetic fluxes φm and φt when the Scott connection transformer 3 is disconnected by the circuit breaker 2 according to the present embodiment. The residual magnetic flux φm is the residual magnetic flux of a secondary winding of the main transformer 302. The residual magnetic flux φt is the residual magnetic flux of the secondary winding of the teaser transformer 301.

Figure 11:
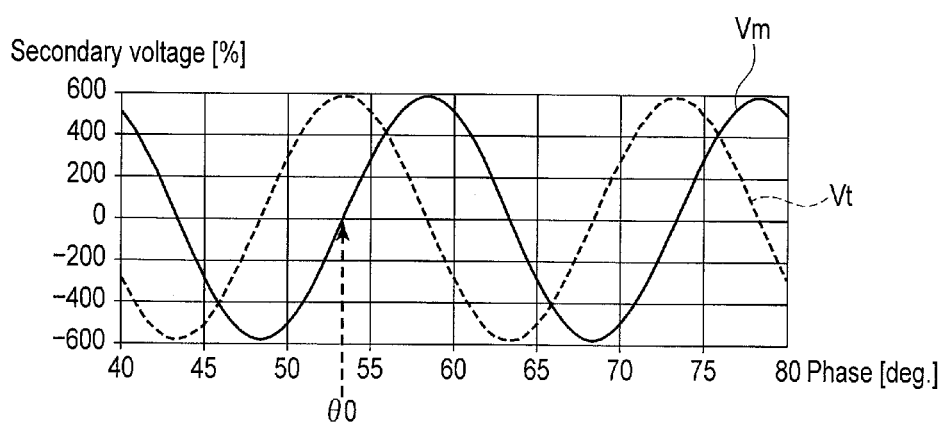
FIG. 11 is a waveform diagram showing secondary voltages in a steady state of the Scott connection transformer, which are measured by a transformer voltage measurement unit according to the first embodiment.

FIG. 11 is a waveform diagram showing secondary voltages Vm and Vt in a steady state of the Scott connection transformer 3 which are measured by the transformer voltage measurement unit 603 according to the present embodiment. The secondary voltage Vm is the secondary voltage of the main transformer 302. The secondary voltage Vt is the secondary voltage of the teaser transformer 301.

The residual magnetic fluxes φm and φt shown in FIG. 10 indicate the residual magnetic fluxes in a case where the interrupting phase is changed from a phase θ0 shown in FIG. 11 as a reference (0 degrees) to 180 degrees every 30 degrees, when the single-phase alternating-current voltages Vm and Vt in the steady state shown in FIG. 11 are applied. As shown in FIG. 10, the residual magnetic fluxes φm and φt of the secondary winding of the Scott connection transformer 3 become different in accordance with the interrupting phase.

Figure 12:
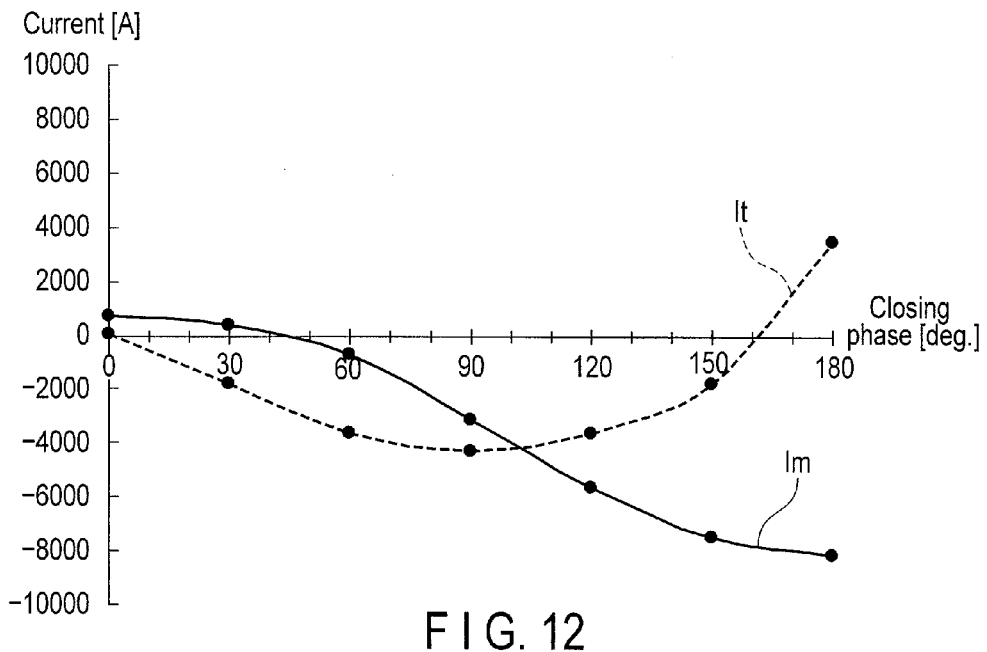
FIG. 12 is a graph showing magnetizing inrush currents flowing through the circuit breaker in accordance with a relation between a interrupting phase of zero degrees and a closing phase in the Scott connection transformer according to the first embodiment.
Figure 13:
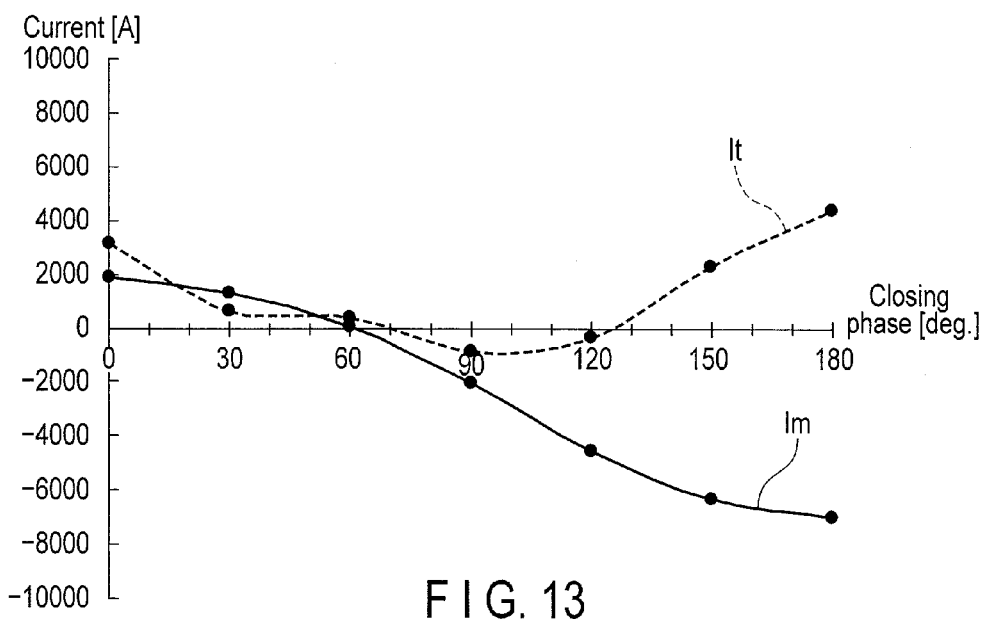
FIG. 13 is a graph snowing the magnetizing inrush currents flowing through the circuit breaker in accordance with a relation between a interrupting phase of 60 degrees and the closing phase in the Scott connection transformer according to the first embodiment.

FIG. 12 to FIG. 15 are graphs showing magnetizing inrush currents Im and It flowing through the circuit breaker 2 in accordance with a relation between the interrupting phase and the closing phase in the Scott connection transformer 3 according to the present embodiment. The magnetizing inrush current Im indicates a secondary current of the M-phase (the A-phase of the electric-car line 1). The magnetizing inrush current It indicates the secondary current of the T-phase (the B-phase of the electric-car line 1). In FIG. 12, the interrupting phase (the phase θ0 of FIG. 11) is used as the reference (0 degrees), and the closing phase is changed from 0 to 180 degrees every 30 degrees. In FIG. 13 to FIG. 15, the interrupting phases are 60 degrees, 90 degrees, and 150 degrees, respectively, and the closing phase is changed similarly to FIG. 12.

As shown in FIGS. 12 to 15, even in the case of any of the interrupting phases, the magnetizing inrush current is suppressed most when the interrupting phase is the same as the closing phase, as in the closing phase of the magnetizing inrush current suppression apparatus 6.

According to the present embodiment, the last (latest) interrupting phase of the Scott connection transformer 3 is stored, and in the same closing phase as this interrupting phase, the Scott connection transformer 3 is energized by the circuit breaker 2, so that the magnetizing inrush current can be suppressed.

Second Embodiment

Figure 16:
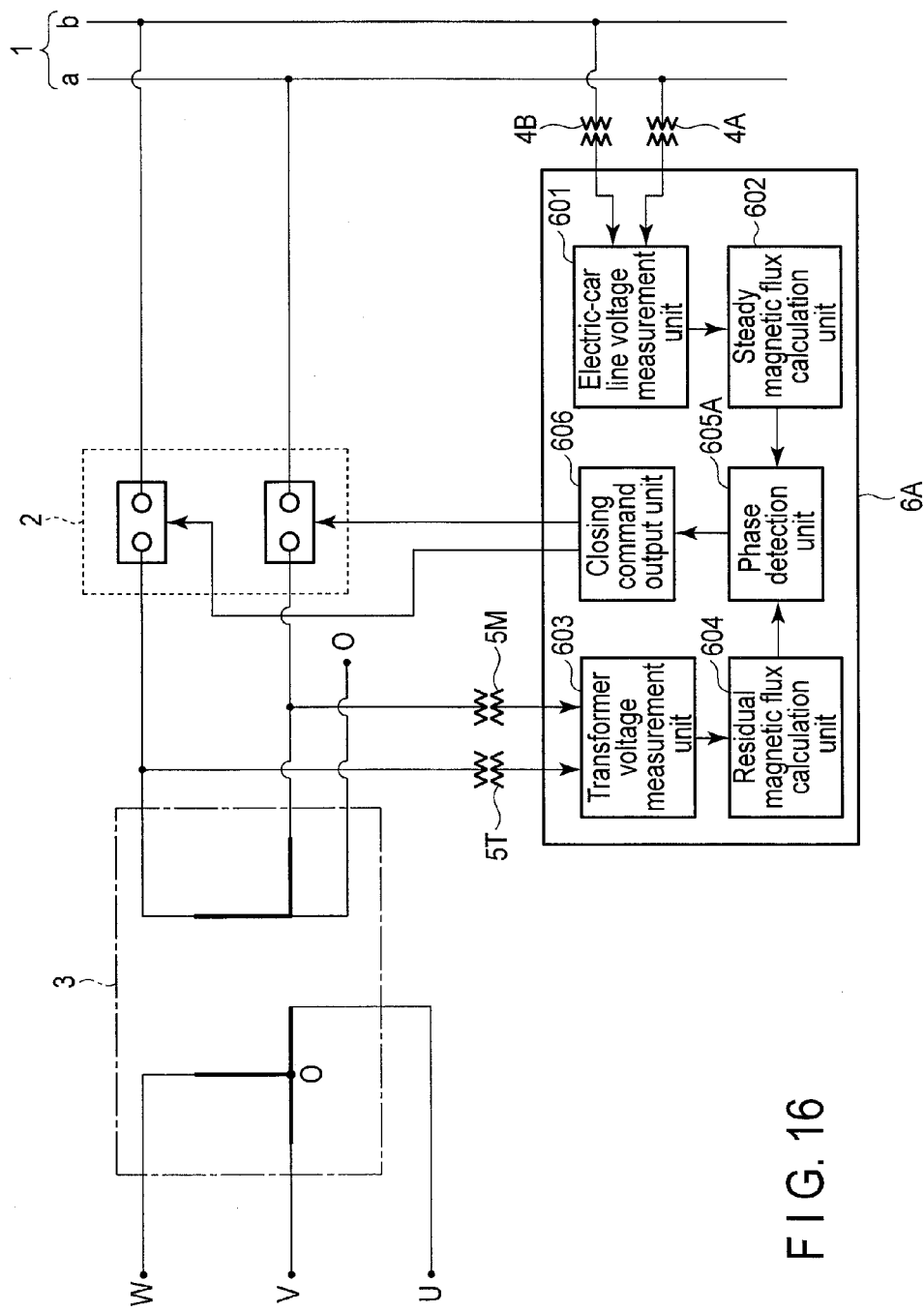
FIG. 16 is a block diagram showing a structure of a power system to which a magnetizing inrush current suppression apparatus according to a second embodiment of the invention is applied.

FIG. 16 is a block diagram showing a structure of a power system to which a magnetizing inrush current suppression apparatus 6A according to a second embodiment of the invention is applied.

The power system according to the present embodiment has a structure where in the power system according to the first embodiment shown in FIG. 1, magnetizing inrush current suppression apparatus 6A is disposed in place of the magnetizing inrush current suppression apparatus 6. Magnetizing inrush current suppression apparatus 6A has a structure where in the magnetizing inrush current suppression apparatus 6 according to the first embodiment, the phase detection unit 605 is replaced with a phase detection unit 605A, and a steady magnetic flux calculation unit 602 and a residual magnetic flux calculation unit 604 are added. The other structure is similar to the first embodiment.

The structure of magnetizing inrush current suppression apparatus 6A will be described with reference to FIG. 16 to FIG. 18.

Figure 17:
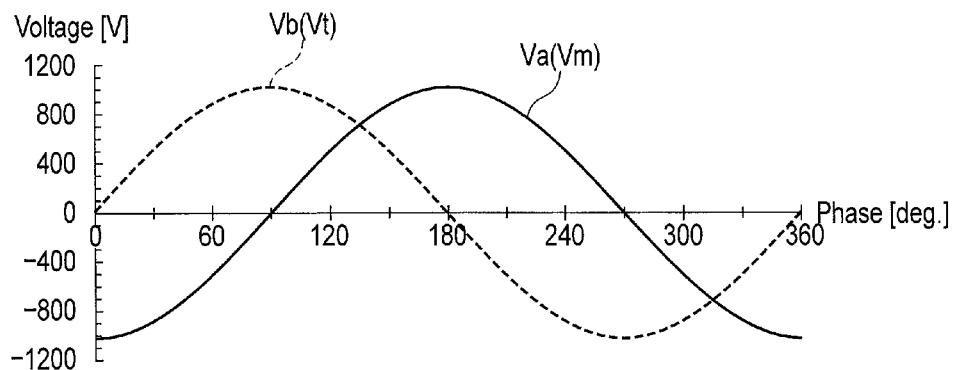
FIG. 17 is a waveform diagram showing each of voltage waveforms of phase voltages of an electric-car line which is calculated by a steady magnetic flux calculation unit according to the second embodiment.
Figure 18:
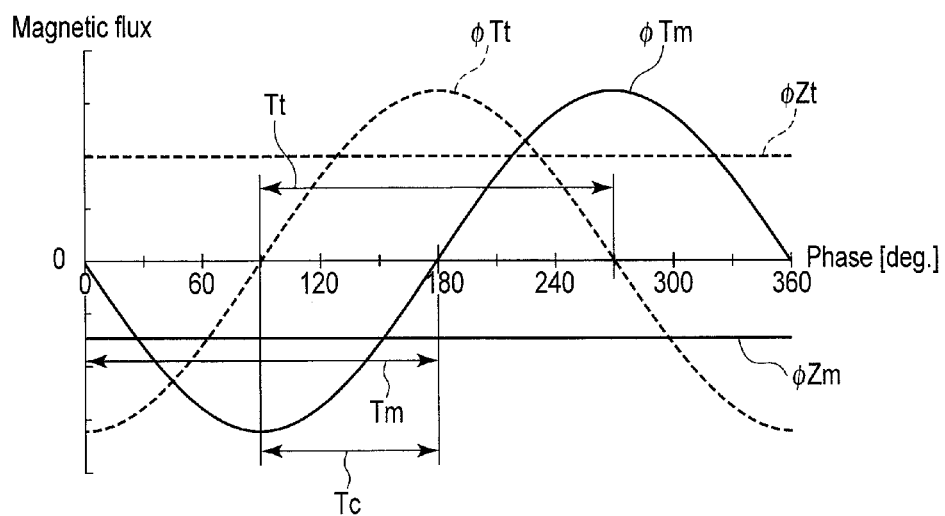
FIG. 18 is a waveform diagram showing magnetic flux waveforms for explaining an object phase region to be closed of the magnetizing inrush current suppression apparatus according to the second embodiment.

FIG. 17 is a waveform diagram showing voltage waveforms of phase voltages Va and Vb of an electric-car line 1 (secondary voltages Vm and Vt of a Scott connection transformer 3) which are calculated by the steady magnetic flux calculation unit 602 according to the present embodiment. FIG. 18 is a waveform diagram showing magnetic flux waveforms for explaining an object phase region Tc to be closed of magnetizing inrush current suppression apparatus 6A according to the present embodiment.

An electric-car line voltage measurement unit 601 measures the respective phase voltages Va and Vb of the electric-car line 1 based on detection signals detected by electric-car line voltage detectors 4A and 4B. The voltage Va is an A-phase voltage of the electric-car line 1. The voltage Vb is a B-phase voltage of the electric-car line 1. The electric-car line voltage measurement unit 601 outputs the respective measured phase voltages Va and Vb of the electric-car line 1 to the steady magnetic flux calculation unit 602.

The steady magnetic flux calculation unit 602 integrates the phase voltages Va and Vb of the electric-car line 1 which are measured by the electric-car line voltage measurement unit 601, respectively. The steady magnetic flux calculation unit 602 obtains these integrated values as secondary winding magnetic fluxes (the steady magnetic fluxes) φTm and φTt when an iron core of the Scott connection transformer 3 is steady. That is, the A-phase voltage Va and B-phase voltage Vb of the electric-car line 1 are regarded as the secondary voltage Vm of a main phase and the secondary voltage Vt of a T-phase, respectively. The steady magnetic flux calculation unit 602 calculates the steady magnetic fluxes φTm and φTt until a circuit breaker 2 is closed. The steady magnetic flux calculation unit 602 outputs the measured steady magnetic fluxes φTm and φTt to the phase detection unit 605A.

A transformer voltage measurement unit 603 measures the respective secondary voltages Vm and Vt of the Scott connection transformer 3, based on detection signals detected by transformer secondary voltage detectors 5M and 5T. The transformer voltage measurement unit 603 outputs the respective measured secondary voltages Vm and Vt to the residual magnetic flux calculation unit 604.

The residual magnetic flux calculation unit 604 integrates the respective secondary voltages Vm and Vt measured by the transformer voltage measurement unit 603 immediately after the Scott connection transformer 3 is disconnected by the circuit breaker 2. The residual magnetic flux calculation unit 604 obtains these integrated values as residual magnetic fluxes (the secondary winding magnetic fluxes) $\phi Zm$ and $\phi Zt$ of the iron core of the Scott connection transformer 3. The residual magnetic flux $\phi Zm$ is the residual magnetic flux of a secondary winding of the main transformer 302. The residual magnetic flux $\phi Zt$ is the residual magnetic flux of a secondary winding of a main transformer 301. The residual magnetic flux calculation unit 604 outputs the calculated residual magnetic fluxes $\phi Zm$ and $\phi Zt$ to the phase detection unit 605A.

Into the phase detection unit 605A, there are input the steady magnetic fluxes $\phi Tm$ and $\phi Tt$ calculated by the steady magnetic flux calculation unit 602 and the residual magnetic fluxes $\phi Zm$ and $\phi Zt$ calculated by the residual magnetic flux calculation unit 604. The phase detection unit 605A identifies phase sections Tm and Tt where polarities of the steady magnetic fluxes $\phi Tm$ and $\phi Tt$ calculated by the steady magnetic flux calculation unit 602 match polarities of the residual magnetic fluxes $\phi Zm$ and $\phi Zt$ calculated by the residual magnetic flux calculation unit 604, respectively, every secondary winding magnetic flux. The phase detection unit 605A identifies the object phase region Tc to be closed, based on the respective detected phase sections Tm and Tt. The phase detection unit 605A outputs, to a closing command output unit 606, the identified object phase region Tc to be closed.

The phase detection unit 605A outputs the object phase region Tc to be closed to the closing command output unit 606 every phase, when the circuit breaker 2 is closed separately for each phase. The phase detection unit 605A outputs the same object phase region Tc to be closed of each phase to the closing command output unit 606, when the phases of the circuit breaker 2 are simultaneously closed. At this time, as shown in FIG. 18, the object phase region Tc to be closed is a phase section where the phase sections Tm and Tt overlap with each other in which the polarities of the steady magnetic fluxes $\phi Tm$ and $\phi Tt$ match the polarities of the residual magnetic fluxes $\phi Zm$ and $\phi Zt$, respectively, every secondary winding magnetic flux.

The closing command output unit 606 outputs a closing command to the operation mechanism which drives main contacts of the respective phases of the circuit breaker 2 in the object phase region Tc to be closed which is detected by the phase detection unit 605A. Consequently, the circuit breaker 2 is closed.

Next, suppression of a magnetizing inrush current by magnetizing inrush current suppression apparatus 6A will be described with reference to FIG. 19 to FIG. 21. Here, a case where the respective phases of the circuit breaker 2 are simultaneously closed is described.

Figure 19:
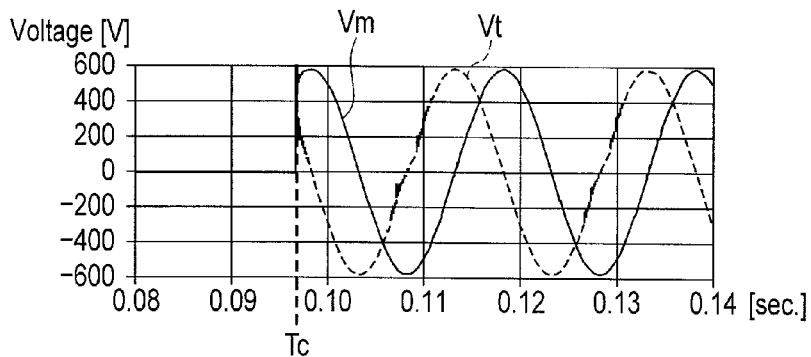
FIG. 19 is a waveform diagram showing secondary voltages before and after connecting of a Scott connection transformer according to the second embodiment.
Figure 20:
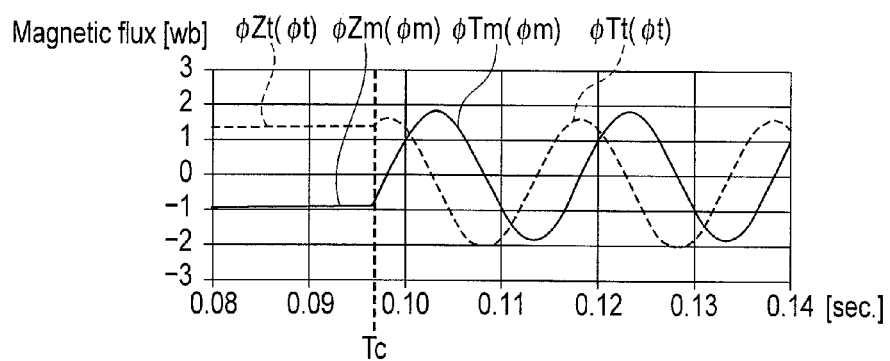
FIG. 20 is a waveform diagram showing secondary winding magnetic fluxes before and after the connecting of the Scott connection transformer according to the second embodiment.
Figure 21:
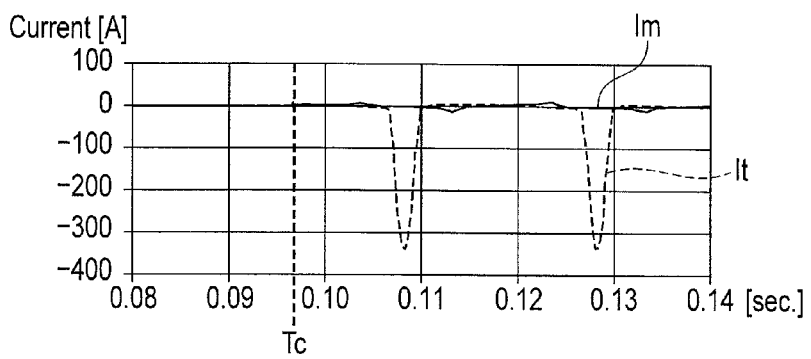
FIG. 21 is a waveform diagram showing magnetizing inrush currents before and after the connecting of the Scott connection transformer according to the second embodiment.

FIG. 19 to FIG. 21 show an example of a state before and after the connecting Tc of the Scott connection transformer 3 by the circuit breaker 2. FIG. 19 is a waveform diagram showing the secondary voltages Vm and Vt. FIG. 20 is a waveform diagram showing secondary winding magnetic fluxes $\phi m$ and $\phi t$ (the steady magnetic fluxes $\phi Tm$ and $\phi Tt$ and the residual magnetic fluxes $\phi Zm$ and $\phi Zt$). FIG. 21 is a waveform diagram showing magnetizing inrush currents Im and It.

When the secondary voltages Vm and Vt shown in FIG. 19 are applied to a secondary side of the Scott connection transformer 3 which is steady, the residual magnetic fluxes $\phi Zm$ and $\phi Zt$ shown in FIG. 20 are present before the connecting Tc by the circuit breaker 2.

When the circuit breaker 2 is closed by magnetizing inrush current suppression apparatus 6A, the magnetizing inrush currents Im and It shown in FIG. 21 are suppressed to about 300 amperes at maximum.

According to the present embodiment, the steady magnetic fluxes $\phi Tm$ and $\phi Tt$ of the secondary winding magnetic fluxes of the Scott connection transformer 3 can be obtained from the phase voltages Va and Vb of the electric-car line 1. Therefore, when the secondary voltages of the Scott connection transformer 3 are measured to obtain the residual magnetic fluxes $\phi Zm$ and $\phi Zt$, the object phase region. Tc to be closed for closing the circuit breaker 2 can be identified.

Third Embodiment

Figure 22:
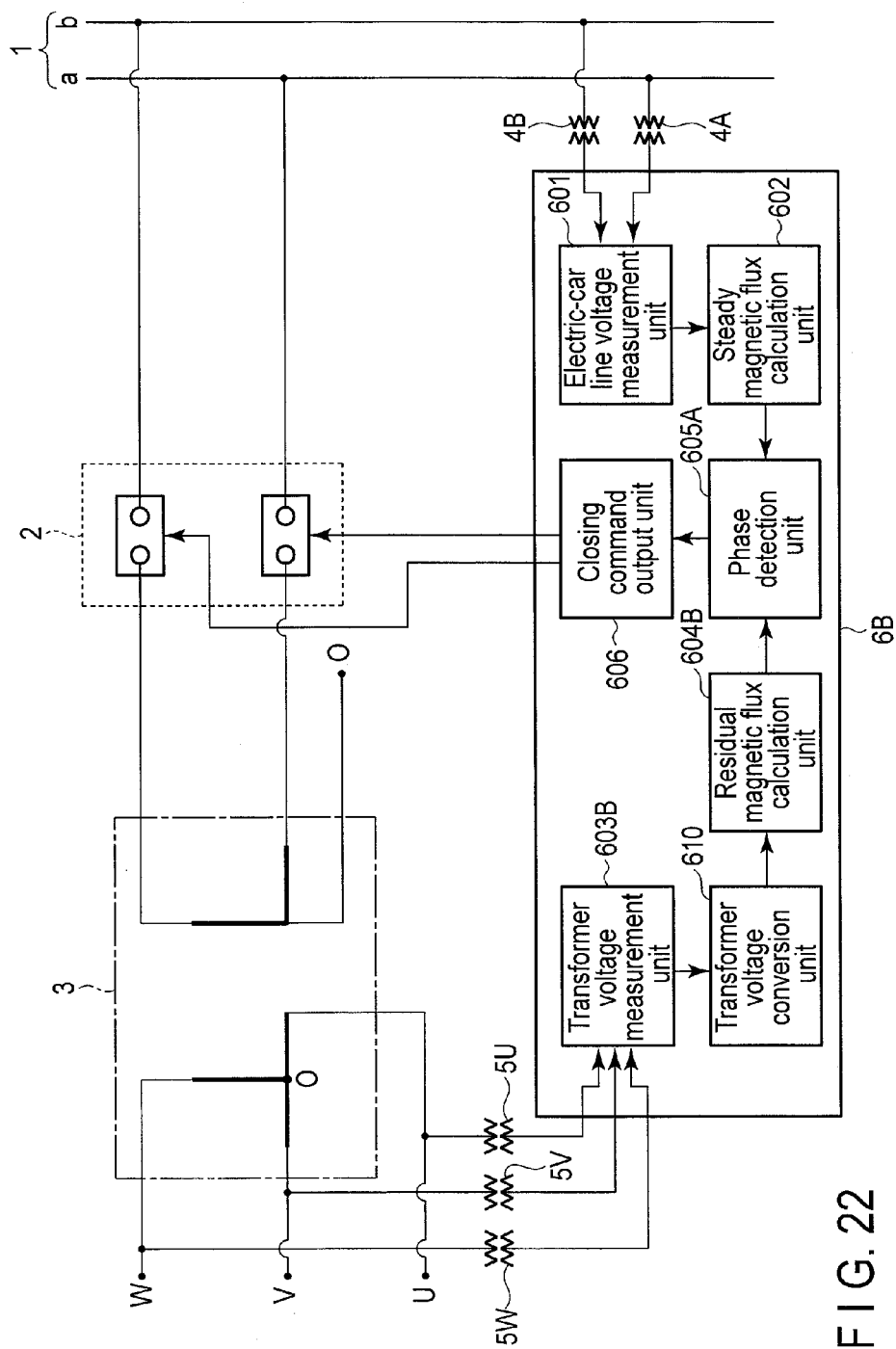
FIG. 22 is a block diagram showing a structure of a power system to which a magnetizing inrush current suppression apparatus according to a third embodiment of the invention is applied.

FIG. 22 is a block diagram showing a structure of a power system to which a magnetizing inrush current suppression apparatus 6B according to a third embodiment of the invention is applied.

The power system according to the present embodiment has a structure where in the power system according to the second embodiment shown in FIG. 16, transformer primary voltage detectors 5U, 5V and 5W are provided in place of the transformer secondary voltage detectors 5T and 5M, and magnetizing inrush current suppression apparatus 6A is replaced with magnetizing inrush current suppression apparatus 6B. Magnetizing inrush current suppression apparatus 6B has a structure where in magnetizing inrush current suppression apparatus 6A according to the second embodiment, the transformer voltage measurement unit 603 and the residual magnetic flux calculation unit 604 are replaced with a transformer voltage measurement unit 603B and a residual magnetic flux calculation unit 604B, respectively, and a transformer voltage conversion unit 610 is added. The other structure is similar to the second embodiment.

The three transformer primary voltage detectors 5U, 5V and 5W are measuring instruments for measuring terminal voltages of terminals (the U-phase, the V-phase, and the W-phase) on a primary side of a Scott connection transformer 3, respectively. Each of the transformer primary voltage detectors 5U, 5V and 5W is, for example, an instrument transformer. The transformer primary voltage detectors 5U, 5V and 5W output detected values as detection signals to magnetizing inrush current suppression apparatus 6B.

The transformer voltage measurement unit 603B measures phase voltages on the primary side of the Scott connection transformer 3, based on the detection signals detected by the transformer primary voltage detectors 5U, 5V and 5W. The transformer voltage measurement unit 603B outputs the respective measured phase voltages to the transformer voltage conversion unit 610.

Calculation processing by the transformer voltage conversion unit 610 according to the present embodiment will be described with reference to FIG. 23 to FIG. 25.

Figure 23:
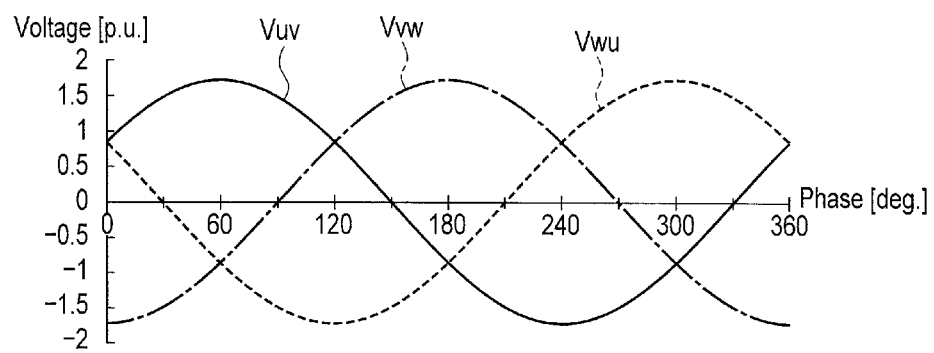
FIG. 23 is a waveform diagram showing a voltage waveform of each line voltage which is calculated by a transformer voltage conversion unit according to the third embodiment.

FIG. 23 is a waveform diagram showing voltage waveforms of line voltages Vuv, Vvw and Vwu which are calculated by the transformer voltage conversion unit 610. FIG. 24 is a waveform diagram showing voltage waveforms of primary winding voltages VDm and VDt of the Scott connection transformer 3 after conversion by the transformer voltage conversion unit 610. FIG. 25 is a waveform diagram showing voltage waveforms of secondary voltages Vm and Vt of the Scott connection transformer 3.

The transformer voltage conversion unit 610 calculates the respective line voltages Vuv, Vvw and Vwu based on the respective phase voltages measured by the transformer voltage measurement unit 603B. The transformer voltage conversion unit 610 converts the respective calculated line voltages Vuv, Vvw and Vwu to the primary winding voltages VDm and VDt of the Scott connection transformer 3 in accordance with the following equations. The primary winding voltage VDm is the primary winding voltage of the main transformer 302 after the conversion. The primary winding voltage VDt is the primary winding voltage of the teaser transformer 301 after the conversion. The transformer voltage conversion unit 610 outputs the converted primary winding voltages VDm and VDt of the Scott connection transformer 3 to the residual magnetic flux calculation unit 604B.

$$VDm=(\sqrt{3}/2)Vuv \quad (1)$$

$$VDt=(Vwu-Vvw)/2 \quad (2)$$

Figure 24:
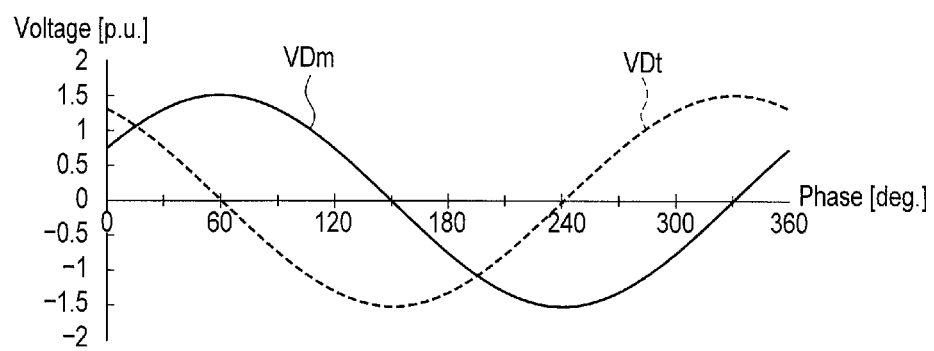
FIG. 24 is a waveform diagram showing voltage waveforms of primary winding voltages of a Scott connection transformer after conversion by the transformer voltage conversion unit according to the third embodiment.
Figure 25:
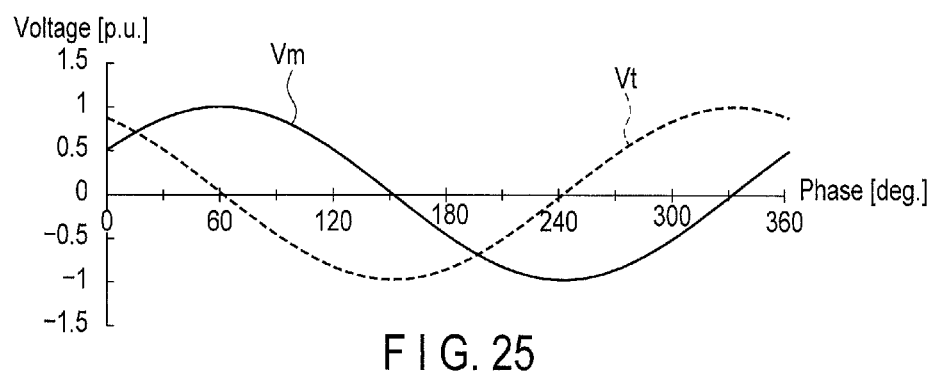
FIG. 25 is a waveform diagram showing voltage waveforms of secondary voltages of the Scott connection transformer according to the third embodiment.

The transformer voltage conversion unit 610 converts the respective line voltages Vuv, Vvw and Vwu shown in FIG. 23 to the primary winding voltages VDm and VDt of the Scott connection transformer 3 shown in FIG. 24. The converted primary winding voltages VDm and VDt have waveforms of the same cycles and phases as cycles and phases of the voltage waveforms of the secondary voltages Vm and Vt of the Scott connection transformer 3 shown in FIG. 25, respectively. Therefore, the primary winding voltages VDm and VDt converted by the transformer voltage conversion unit 610 are regarded and used as secondary voltages for calculating residual magnetic fluxes $\phi Zm$ and $\phi Zt$ of windings on a secondary side of the Scott connection transformer 3.

The residual magnetic flux calculation unit 604B integrates the respective primary winding voltages VDm and VDt converted by the transformer voltage conversion unit 610 immediately after disconnecting of the Scott connection transformer 3 by a circuit breaker 2, respectively. The residual magnetic flux calculation unit 604B obtains these integrated values as the residual magnetic fluxes (the secondary winding magnetic fluxes) $\phi Zm$ and $\phi Zt$ of the iron core of the Scott connection transformer 3. The other respects are similar to the residual magnetic flux calculation unit 604 according to the second embodiment.

According to the present embodiment, in place of the transformer secondary voltage detectors 5T and 5M, the transformer primary voltage detectors 5U, 5V and 5W are provided, so that a function and an effect similar to those of the second embodiment can be obtained.

Fourth Embodiment

Figure 26:
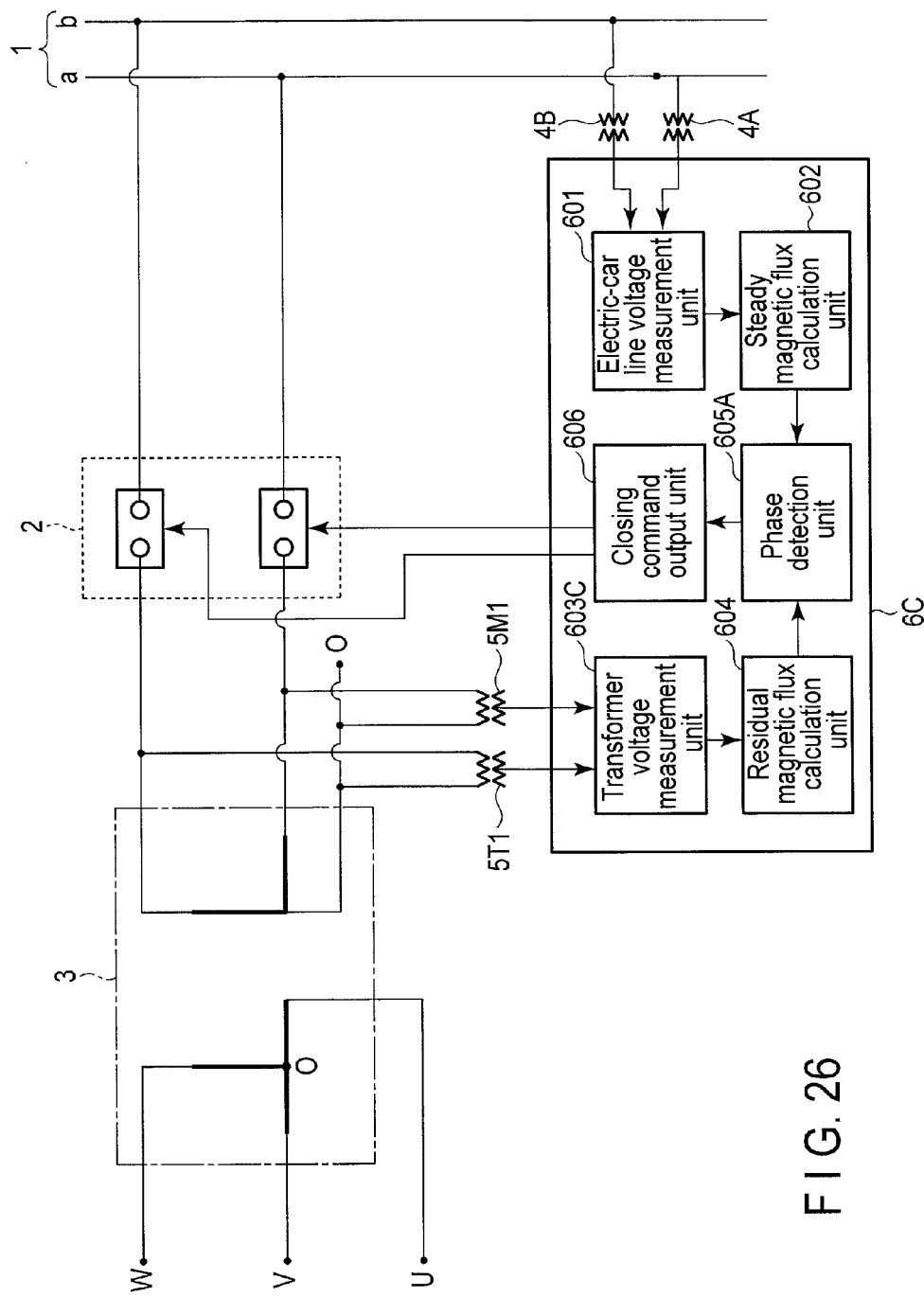
FIG. 26 is a block diagram showing a structure of a power system to which a magnetizing inrush current suppression apparatus according to a fourth embodiment of the invention is applied.

FIG. 26 is a block diagram showing a structure of a power system to which a magnetizing inrush current suppression apparatus 6C according to a fourth embodiment of the invention is applied.

The power system according to the present embodiment has a structure where in the power system according to the second embodiment shown in FIG. 16, transformer secondary voltage detectors 5T1 and 5M1 are provided in place of the transformer secondary voltage detectors 5T and 5M, and magnetizing inrush current suppression apparatus 6A is replaced with magnetizing inrush current suppression apparatus 6C. Magnetizing inrush current suppression apparatus 6C has a structure where in magnetizing inrush current suppression apparatus 6A according to the second embodiment, the transformer voltage measurement unit 603 is replaced with a transformer voltage measurement unit 603C. The other structure is similar to the second embodiment.

The two transformer secondary voltage detectors 5M1 and 5T1 measure a secondary voltage of a Scott connection transformer 3 (the voltage to ground of each phase on a secondary side) and a voltage to ground of a connection point (the midpoint) O between the main transformer 302 and the teaser transformer 301. The transformer secondary voltage detector 5M1 detects a voltage obtained by subtracting the voltage to ground of the midpoint from the secondary voltage of the main phase. That is, the transformer secondary voltage detector 5M1 detects a secondary winding voltage of the main transformer 302. The transformer secondary voltage detector 5T1 detects a voltage obtained by subtracting the voltage to ground of the midpoint from the secondary voltage of the T-phase. That is, the transformer secondary voltage detector 5T1 detects a secondary winding voltage of the teaser transformer 301. The other respects are similar to the transformer secondary voltage detectors 5T and 5M according to the second embodiment.

The transformer voltage measurement unit 603C measures secondary winding voltages Vm and Vt of the Scott connection transformer 3, based on detection signals detected by the transformer secondary voltage detectors 5M1 and 5T1. The other respects are similar to the transformer voltage measurement unit 603 according to the second embodiment.

Next, suppression of a magnetizing inrush current by magnetizing inrush current suppression apparatus 6C will be described with reference to FIG. 27 to FIG. 29. Here, a case where phases of a circuit breaker 2 are substantially simultaneously closed is described.

Figure 27:
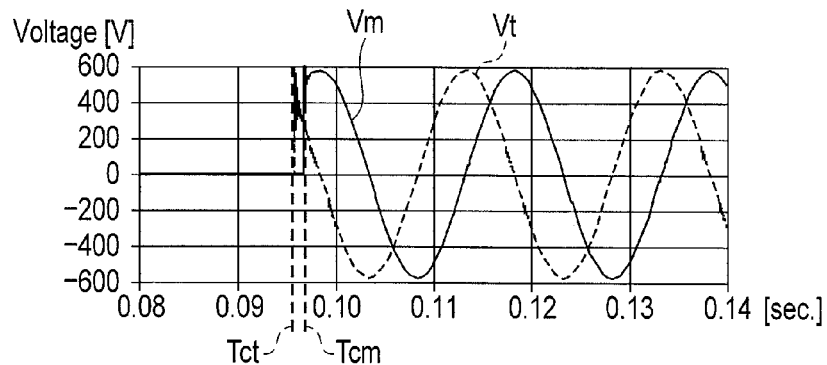
FIG. 27 is a waveform diagram showing secondary voltages before and after connecting of a Scott connection transformer according to the fourth embodiment.
Figure 28:
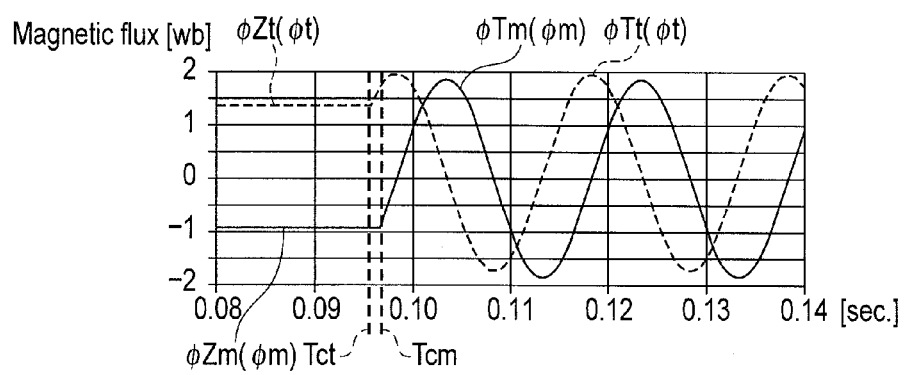
FIG. 28 is a waveform diagram showing secondary winding magnetic fluxes before and after the connecting of the Scott connection transformer according to the fourth embodiment.
Figure 29:
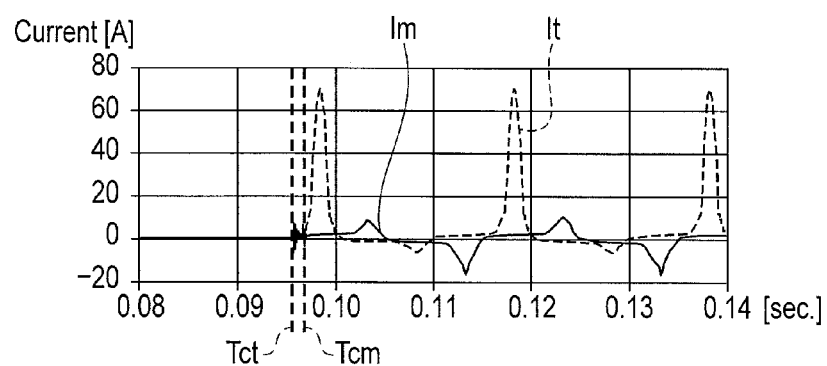
FIG. 29 is a waveform diagram showing magnetizing inrush currents before and after the connecting of the Scott connection transformer according to the fourth embodiment.

FIG. 27 to FIG. 29 show an example of a state before and after connecting Tcm and Tct of the Scott connection transformer 3 by the circuit breaker 2. FIG. 27 is a waveform diagram showing the secondary voltages Vm and Vt. FIG. 28 is a waveform diagram showing secondary winding magnetic fluxes $\phi m$ and $\phi t$ (steady magnetic fluxes $\phi Tm$ and $\phi Tt$ and residual magnetic fluxes $\phi Zm$ and $\phi Zt$). FIG. 29 is a waveform diagram showing magnetizing inrush currents Im and It.

The connecting Tcm indicates a connecting time of a main phase. The connecting Tct indicates a connecting time of a T-phase. The connecting time Tcm of the main phase and the connecting time Tct of the T-phase are the connectings in the object phase region Tc to be closed of magnetizing inrush current suppression apparatus 6C.

When the secondary voltages Vm and Vt shown in FIG. 27 are applied to a secondary side of the Scott connection transformer 3 which is steady, the residual magnetic fluxes $\phi Zm$ and $\phi Zt$ shown in FIG. 28 are present before the connectings Tcm and Tct by the circuit breaker 2.

When the circuit breaker 2 is closed by magnetizing inrush current suppression apparatus 6C, the magnetizing inrush currents Im and It shown in FIG. 29 are suppressed to about 70 amperes at maximum.

According to the present embodiment, the voltage to ground of the connection point O between the main transformer 302 and the teaser transformer 301 is measured, whereby a measurement accuracy of the respective secondary winding voltages Vm and Vt of the Scott connection transformer 3 can be enhanced. Therefore, a measurement accuracy of the residual magnetic fluxes $\phi Zm$ and $\phi Zt$ can be enhanced. Consequently, an accuracy with which the magnetizing inrush current is suppressed can be enhanced more than in the second embodiment.

Fifth Embodiment

FIG. 30 is a block diagram showing a structure of a power system to which an magnetizing inrush current suppression apparatus 6D according to a fifth embodiment of the invention is applied.

The power system according to the present embodiment has a structure where in the power system according to the first embodiment shown in FIG. 1, magnetizing inrush current suppression apparatus 6D is provided in place of the magnetizing inrush current suppression apparatus 6. Magnetizing inrush current suppression apparatus 6D has a structure where in the magnetizing inrush current suppression apparatus 6 according to the first embodiment, the phase detection unit 605 is replaced with a phase detection unit 605D, and an opening command output unit 609 is added. The other structure is similar to the first embodiment.

In the phase detection unit 605D, a predetermined phase (or the phase section) is held. Additionally, this predetermined phase may beforehand be set, or held in accordance with opened/closed conditions of a circuit breaker 2 in the past. The phase detection unit 605D detects the held phase based on each phase voltage of an electric-car line 1 which is measured by an electric-car line voltage measurement unit 601 and each secondary voltage of a Scott connection transformer 3 which is measured by a transformer voltage measurement unit 603. The phase detection unit 605D outputs the detected phase to the opening command output unit 609, when the circuit breaker 2 is opened. The phase detection unit 605D outputs the detected phase to the closing command output unit 606, when the circuit breaker 2 is closed.

The opening command output unit 609 uses the phase detected by the phase detection unit 605D as an opening phase, and outputs an opening command to the operation mechanism which drives the main contact of each phase of the circuit breaker 2. Consequently, the circuit breaker 2 is opened.

The closing command output unit 606 uses the phase detected by the phase detection unit 605D as the closing phase, and outputs the closing command to the operation mechanism which drives the main contact of each phase of the circuit breaker 2. Consequently, the circuit breaker 2 is closed.

According to the present embodiment, the interrupting phase of the Scott connection transformer 3 is constantly the phase which is beforehand set. Moreover, the closing phase in which the Scott connection transformer 3 is energized is also constantly the phase which is beforehand set. Consequently, the interrupting phase is constantly the same as the closing phase, and hence it is possible to suppress a magnetizing inrush current generated when the Scott connection transformer 3 is energized, in the same manner as in the first embodiment.

Sixth Embodiment

FIG. 31 is a block diagram showing a structure of a power system to which a magnetizing inrush current suppression apparatus 6E according to a sixth embodiment of the invention is applied.

Magnetizing inrush current suppression apparatus 6E has a structure where in magnetizing inrush current suppression apparatus 6A according to the second embodiment shown in FIG. 16, the phase detection unit 605A is replaced with a phase detection unit 605E, and a measurement information holding unit 607, an opening phase control unit 608 and an opening command output unit 609 are added. The other structure is similar to magnetizing inrush current suppression apparatus 6A according to the second embodiment.

Prior to an operation of magnetizing inrush current suppression apparatus 6E, the measurement information holding unit 607 measures voltage interrupting phases measured by the transformer voltage measurement unit 603 and magnetic flux signals calculated by the residual magnetic flux calculation unit 604 when the circuit breaker 2 is opened a plurality of times. The measurement information holding unit 607 holds, as measurement information, information on characteristics of a residual magnetic flux, for example, a relation between the interrupting phase and the residual magnetic flux, based on the measured voltage interrupting phases and magnetic flux signals.

Into the opening phase control unit 608, there are input the measurement information held by the measurement information holding unit 607 and phase voltages Va and Vb of an electric-car line 1 which are measured by an electric-car line voltage measurement unit 601. The opening phase control unit 608 estimates residual magnetic fluxes $\phi Zm$ and $\phi Zt$ of secondary windings from the measurement information. The opening phase control unit 608 controls an opening phase of the main contact of the circuit breaker 2 so that the interrupting phase constantly becomes the same, based on the estimated residual magnetic fluxes $\phi Zm$ and $\phi Zt$ and the respective phase voltages Va and Vb. The opening phase control unit 608 outputs the controlled opening phase to the opening command output unit 609. The opening command output unit 609 opens the circuit breaker 2 based on the opening phase received from the opening phase control unit 608.

Into the phase detection unit 605E, there are input the measurement information held by the measurement information holding unit 607 and steady magnetic fluxes $\phi Tm$ and $\phi Tt$ calculated by the steady magnetic flux calculation unit 602. The phase detection unit 605E estimates the residual magnetic fluxes $\phi Zm$ and $\phi Zt$ from the measurement information held by the measurement information holding unit 607. The phase detection unit 605E identifies the object phase region Tc to be closed in which the circuit breaker 2 is closed, based on the residual magnetic fluxes $\phi Zm$ and $\phi Zt$ and the steady magnetic fluxes $\phi Tm$ and $\phi Tt$. A method of identifying the object phase region Tc to be closed is similar to the second embodiment.

Here, the opening phase control unit 608 executes the phase control so that the interrupting phase constantly becomes the same. Therefore, in the phase detection unit 605E, the object phase region Tc to be closed may constantly be the same, when there is not any change in the information held by the measurement information holding unit 607 (when the measurement information is not updated).

According to the present embodiment, in addition to the function and effect of the second embodiment, the following function and effect can be obtained.

After the circuit breaker 2, the Scott connection transformer 3 and the like are arranged once in the power system, circuit conditions of this power system are constantly the same. Therefore, when the phase at the interrupting by the circuit breaker 2 is constantly set to be the same, values of the residual magnetic fluxes of the respective phases of the Scott connection transformer 3 must constantly be the same.

When the Scott connection transformer 3 is disconnected by the circuit breaker 2, magnetizing inrush current suppression apparatus 6E controls the opening phase of the circuit breaker 2 so that the interrupting phase constantly becomes the same, to disconnect the Scott connection transformer. That is, magnetizing inrush current suppression apparatus 6E can constantly set the residual magnetic flux to the same value. Therefore, magnetizing inrush current suppression apparatus 6E can constantly set the same phase, also when the circuit breaker 2 is closed to energize the Scott connection transformer 3. Consequently, magnetizing inrush current suppression apparatus 6E can constantly suppress the magnetizing inrush current.

Therefore, even when transformer secondary voltage detectors 5M and 5T are not constantly connected, magnetizing inrush current suppression apparatus 6E can constantly obtain the information of the residual magnetic flux of the Scott connection transformer 3 after the interrupting by the circuit breaker 2, based on the measurement information held by the measurement information holding unit 607. Therefore, the transformer secondary voltage detectors 5M and 5T are connected only at measurement by the measurement information holding unit 607, and may be removed in a usual operation state. Needless to say, the transformer secondary voltage detectors 5M and 5T may permanently be arranged.

Seventh Embodiment

Figure 32:
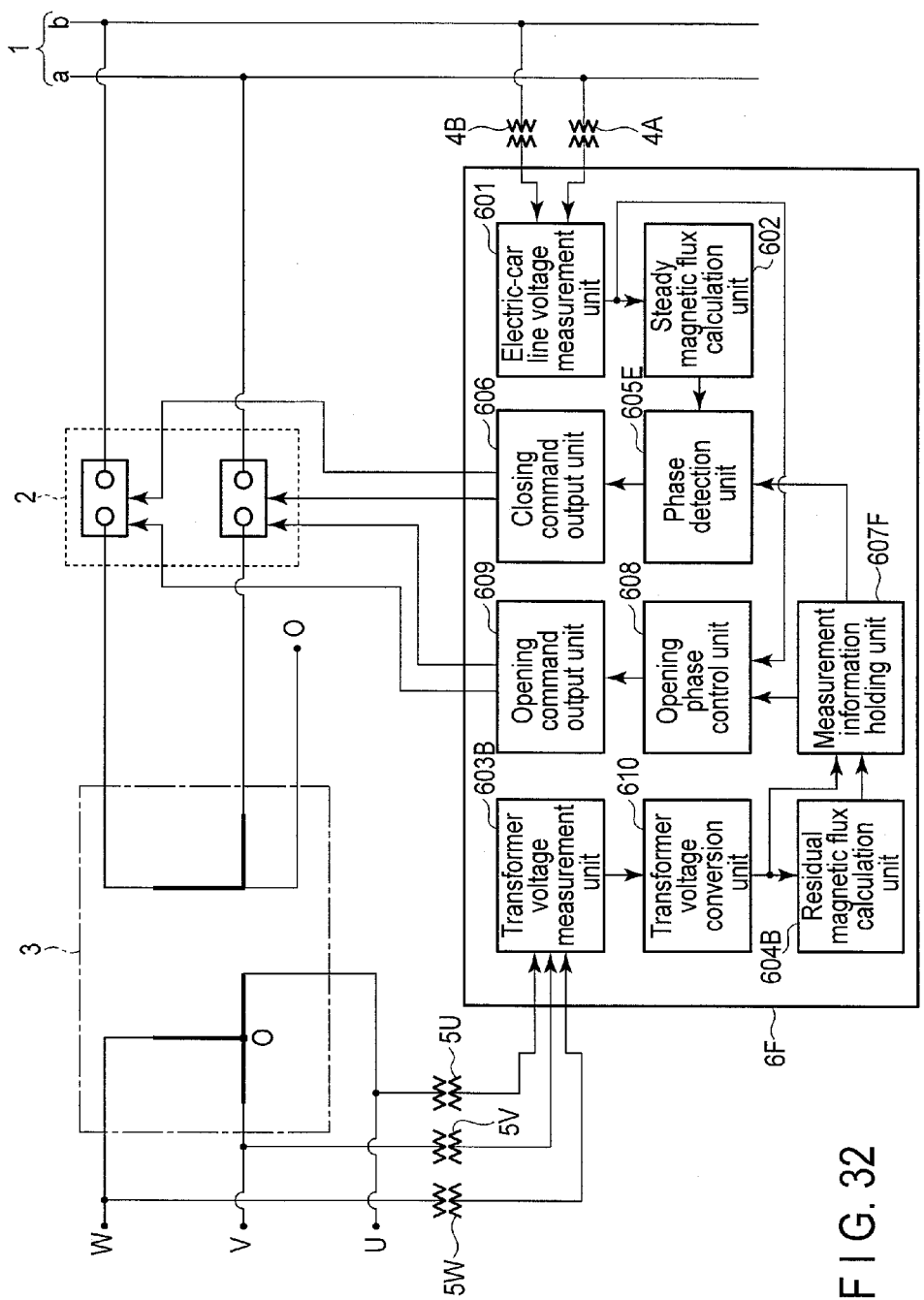
FIG. 32 is a block diagram showing a structure of a power system to which a magnetizing inrush current suppression apparatus according to a seventh embodiment of the invention is applied.

FIG. 32 is a block diagram showing a structure of a power system to which a magnetizing inrush current suppression apparatus 6F according to a seventh embodiment of the invention is applied.

Magnetizing inrush current suppression apparatus 6F has a structure where in magnetizing inrush current suppression apparatus 6B according to the third embodiment shown in FIG. 22, the phase detection unit 605A is replaced with the phase detection unit 605E according to the sixth embodiment, and a measurement information holding unit 607F, the opening phase control unit 608 according to the sixth embodiment and the opening command output unit 609 according to the sixth embodiment are added. The other structure is similar to magnetizing inrush current suppression apparatus 6B according to the third embodiment.

Prior to an operation of magnetizing inrush current suppression apparatus 6F, the measurement information holding unit 607F measures voltage interrupting phases calculated by the voltage conversion unit 610 and magnetic flux signals calculated by the residual magnetic flux calculation unit 604B when the circuit breaker 2 is opened a plurality of times. The measurement information holding unit 607F holds, as measurement information, information on characteristics of a residual magnetic flux, for example, a relation between the interrupting phase and the residual magnetic flux, based on the measured voltage interrupting phases and magnetic flux signals.

The opening phase control unit 608, similarly to the sixth embodiment, controls the opening phase so that the interrupting phase constantly becomes the same, based on the measurement information held by the measurement information holding unit 607F and respective phase voltages Va and Vb of the electric-car line 1 which are measured by the electric-car line voltage measurement unit 601. The opening phase control unit 608 outputs the controlled opening phase to the opening command output unit 609.

The opening command output unit 609 opens the circuit breaker 2 based on the opening phase received from the opening phase control unit 608.

The phase detection unit 605E, similarly to the sixth embodiment, identifies the object phase region Tc to be closed in which the circuit breaker 2 is closed, based on the measurement information held by the measurement information holding unit 607F and steady magnetic fluxes φTm and φTt calculated by the steady magnetic flux calculation unit 602.

According to the present embodiment, it is possible to obtain functions and effects which are similar to those of the third embodiment and the sixth embodiment, respectively.

Eighth Embodiment

FIG. 33 is a block diagram showing a structure of a power system to which a magnetizing inrush current suppression apparatus 6G according to an eighth embodiment of the invention is applied.

The power system according to the present embodiment has a structure where in the power system according to the sixth embodiment shown in FIG. 31, the transformer secondary voltage detectors 5T1 and 5M1 according to the fourth embodiment are provided in place of the transformer secondary voltage detectors 5T and 5M, and magnetizing inrush current suppression apparatus 6E is replaced with magnetizing inrush current suppression apparatus 6G. Magnetizing inrush current suppression apparatus 6G has a structure where in magnetizing inrush current suppression apparatus 6E according to the sixth embodiment, the transformer voltage measurement unit 603 is replaced with the transformer voltage measurement unit 603C according to the fourth embodiment. The other structure is similar to the sixth embodiment.

The transformer secondary voltage detectors 5M1 and 5T1, similarly to the fourth embodiment, measure the voltage to ground of the midpoint O of the Scott connection transformer 3, to detect a secondary winding voltage of the main transformer 302 and a secondary winding voltage of the teaser transformer 301.

The transformer voltage measurement unit 603C, similarly to the fourth embodiment, measures respective secondary winding voltages Vm and Vt of the Scott connection transformer 3, based on detection signals detected by the transformer secondary voltage detectors 5M1 and 5T1.

According to the present embodiment, it is possible to obtain functions and effects which are similar to those of the fourth embodiment and the sixth embodiment, respectively.

Additionally, in the first embodiment, the interrupting phase may be obtained by either the voltage of the electric-car line 1 which is measured by the electric-car line voltage measurement unit 601 or the secondary voltage of the Scott connection transformer 3 which is measured by the transformer voltage measurement unit 603. Similarly, in the fifth embodiment, the phases (the opening phase and the closing phase) to be set may be set in accordance with either the voltage of the electric-car line 1 or the secondary voltage of the Scott connection transformer 3 which is measured by the transformer voltage measurement unit 603.

In the third embodiment, the transformer primary voltage detectors 5U, 5V and 5W measure the respective phase voltages on the primary side of the Scott connection transformer 3, respectively, but may measure the respective line voltages on the primary side of the Scott connection transformer 3. Consequently, calculation processing to convert the phase voltage to the line voltage in the transformer voltage conversion unit 610 can be omitted.

Further in the respective embodiments, various parameters in the phase control by the magnetizing inrush current suppression apparatus 6 or the like may be corrected for the purpose of further enhancing an accuracy, or the like. For example, in the closing of the circuit breaker 2, a variation of a closing time is present owing to advance discharge called pre-arc generated between the main contacts, an operation variation of the operation mechanism, or the like. Characteristics of the closing variation due to this pre-arc and the variation at the closing of the circuit breaker are acquired beforehand, thereby performing correction in accordance with these characteristics when executing the phase control. Such a correction is performed, whereby the magnetizing inrush current can more securely be suppressed even when these variations are present.

Moreover, in the third embodiment and the seventh embodiment, when the residual magnetic flux is calculated, the voltage is successively converted to the phase voltage, the line voltage, and the primary winding voltage, and then the magnetic flux is obtained, but after obtaining the magnetic flux, the magnetic flux may be converted. For example, when the residual magnetic flux of each secondary winding is obtained from each phase voltage, the magnetic flux of each phase may first be obtained, and then the residual magnetic flux of each secondary winding may be obtained. Moreover, also in the other calculation, an order of calculations or places where the calculations are performed (a computer, various detectors, etc., regardless of whether the places are inside or outside the magnetizing inrush current suppression apparatus) can suitably be changed, as long as the results are the same. This also applies to the other embodiments.

Further in the respective embodiments, the circuit breaker 2 is the each-phase operation type circuit breaker which operates each phase, but may be a collective operation type circuit breaker which collectively operates two phases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetizing inrush current suppression apparatus that suppresses a magnetizing inrush current generated when there is closed a circuit breaker to open and close a connection between a single-phase alternating-current power system and a transformer that converts a three-phase alternating-current voltage to a single-phase alternating-current voltage, the apparatus comprising:
   an interrupting phase detection unit configured to detect a phase when the transformer is disconnected by the circuit breaker;
   a single-phase alternating-current voltage measurement unit configured to measure the single-phase alternating-current voltage on the power system side of the circuit breaker; and
   a closing unit configured to close the circuit breaker in the phase detected by the interrupting phase detection unit, based on the single-phase alternating-current voltage measured by the single-phase alternating-current voltage measurement unit.

2. A magnetizing inrush current suppression apparatus that suppresses a magnetizing inrush current generated when there is closed a circuit breaker to open and close a connection between a single-phase alternating-current power system and a transformer that converts a three-phase alternating-current voltage to a single-phase alternating-current voltage, the apparatus comprising:
   an opening unit configured to open the circuit breaker in a held phase; and
   a closing unit configured to close the circuit breaker in the held phase based on the single-phase alternating-current voltage on the power system side of the circuit breaker.

3. A magnetizing inrush current suppression apparatus that suppresses a magnetizing inrush current generated when there is closed a circuit breaker to open and close a connection between a single-phase alternating-current power system and a transformer that converts a three-phase alternating-current voltage to a single-phase alternating-current voltage, the apparatus comprising:
   a transformer side single-phase alternating-current voltage measurement unit configured to measure the single-phase alternating-current voltage on the transformer side of the circuit breaker;
   a residual magnetic flux calculation unit configured to calculate a residual magnetic flux of each phase of the transformer after the transformer is disconnected by the circuit breaker, based on the single-phase alternating-current voltage measured by the transformer side single-phase alternating-current voltage measurement unit;
   a power system side single-phase alternating-current voltage measurement unit configured to measure the single-phase alternating-current voltage on the power system side of the circuit breaker;
   a steady magnetic flux calculation unit configured to calculate a steady magnetic flux of each phase of the transformer based on the single-phase alternating-current voltage measured by the power system side single-phase alternating-current voltage measurement unit;
   a phase determination unit configured to determine a phase in which a polarity of the residual magnetic flux calculated by the residual magnetic flux calculation unit matches a polarity of the steady magnetic flux calculated by the steady magnetic flux calculation unit in the each phase; and
   a closing unit configured to close the circuit breaker in the phase determined by the phase determination unit.

4. The magnetizing inrush current suppression apparatus according to claim 3, wherein:
   the transformer is a Scott connection transformer in which a main transformer is connected to a teaser transformer at a midpoint,
   the apparatus further comprises the midpoint voltage measurement unit configured to measure a voltage to ground of the midpoint,
   the transformer side single-phase alternating-current voltage measurement unit measures the single-phase alternating-current voltage based on the voltage to ground of the midpoint which is measured by the midpoint voltage measurement unit.

5. The magnetizing inrush current suppression apparatus according to claim 4, further comprising:
   a measurement information holding unit configured to hold information obtained by measuring the residual magnetic flux of the transformer and a interrupting phase of the circuit breaker when the circuit breaker is subjected to an opening operation at least once; and
   an opening unit configured to open the circuit breaker in a same interrupting phase based on the information held by the measurement information holding unit,
   wherein the closing unit closes the circuit breaker based on the interrupting phase by the opening unit.

6. The magnetizing inrush current suppression method according to claim 5, further comprising:
   holding information obtained by measuring the residual magnetic flux of the transformer and a interrupting phase of the circuit breaker when the circuit breaker is subjected to an opening operation at least once;
opening the circuit breaker in a same interrupting phase based on the held information; and
closing the circuit breaker based on the interrupting phase.

7. The magnetizing inrush current suppression apparatus according to claim 3, further comprising:
a measurement information holding unit configured to hold information obtained by measuring the residual magnetic flux of the transformer and a interrupting phase of the circuit breaker when the circuit breaker is subjected to an opening operation at least once; and
an opening unit configured to open the circuit breaker in a same interrupting phase based on the information held by the measurement information holding unit,
wherein the closing unit closes the circuit breaker based on the interrupting phase by the opening unit.

8. A magnetizing inrush current suppression apparatus that suppresses a magnetizing inrush current generated when there is closed a circuit breaker to open and close a connection between a single-phase alternating-current power system and a transformer that converts a three-phase alternating-current voltage to a single-phase alternating-current voltage, the apparatus comprising:
a transformer side three-phase alternating-current voltage measurement unit configured to measure the three-phase alternating-current voltage of the transformer;
a transformer side voltage conversion unit configured to convert the three-phase alternating-current voltage of the transformer which is measured by the transformer side three-phase alternating-current voltage measurement unit to the single-phase alternating-current voltage of the transformer;
a residual magnetic flux calculation unit configured to calculate a residual magnetic flux of each phase of the transformer after the transformer is disconnected by the circuit breaker, based on the single-phase alternating-current voltage converted by the transformer side voltage conversion unit;
a power system side single-phase alternating-current voltage measurement unit configured to measure the single-phase alternating-current voltage on the power system side of the circuit breaker;
a steady magnetic flux calculation unit configured to calculate a steady magnetic flux of each phase of the transformer based on the single-phase alternating-current voltage measured by the power system side single-phase alternating-current voltage measurement unit;
a phase determination unit configured to determine a phase in which a polarity of the residual magnetic flux calculated by the residual magnetic flux calculation unit matches a polarity of the steady magnetic flux calculated by the steady magnetic flux calculation unit in the each phase; and
a closing unit configured to close the circuit breaker in the phase determined by the phase determination unit.

9. The magnetizing inrush current suppression apparatus according to claim 8, further comprising:
a measurement information holding unit configured to hold information obtained by measuring the residual magnetic flux of the transformer and a interrupting phase of the circuit breaker when the circuit breaker is subjected to an opening operation at least once; and
an opening unit configured to open the circuit breaker in a same interrupting phase based on the information held by the measurement information holding unit,
wherein the closing unit closes the circuit breaker based on the interrupting phase by the opening unit.

10. The magnetizing inrush current suppression method according to claim 9, further comprising:
holding information obtained by measuring the residual magnetic flux of the transformer and a interrupting phase of the circuit breaker when the circuit breaker is subjected to an opening operation at least once;
opening the circuit breaker in a same interrupting phase based on the held information; and
closing the circuit breaker based on the interrupting phase.

11. A magnetizing inrush current suppression method that suppresses a magnetizing inrush current generated when there is closed a circuit breaker to open and close a connection between a single-phase alternating-current power system and a transformer that converts a three-phase alternating-current voltage to a single-phase alternating-current voltage, the method comprising:
detecting a phase when the transformer is disconnected by the circuit breaker;
measuring the single-phase alternating-current voltage on the power system side of the circuit breaker; and
closing the circuit breaker in the detected phase based on the measured single-phase alternating-current voltage.

12. The magnetizing inrush current suppression method according to claim 11, wherein:
the transformer is a Scott connection transformer in which a main transformer is connected to a teaser transformer at a midpoint,
the method further comprises measuring a voltage to ground of the midpoint,
the power system side single-phase alternating-current voltage is measured based on the measured voltage to ground of the midpoint.

13. The magnetizing inrush current suppression method according to claim 11, further comprising:
holding information obtained by measuring the residual magnetic flux of the transformer and a interrupting phase of the circuit breaker when the circuit breaker is subjected to an opening operation at least once;
opening the circuit breaker in a same interrupting phase based on the held information; and
closing the circuit breaker based on the interrupting phase.

14. A magnetizing inrush current suppression method that suppresses a magnetizing inrush current generated when there is closed a circuit breaker to open and close a connection between a single-phase alternating-current power system and a transformer that converts a three-phase alternating-current voltage to a single-phase alternating-current voltage, the method comprising:
opening the circuit breaker in a held phase; and
closing the circuit breaker in the held phase based on the single-phase alternating-current voltage on the power system side of the circuit breaker.

15. The magnetizing inrush current suppression method according to claim 14, further comprising:
holding information obtained by measuring the residual magnetic flux of the transformer and a interrupting phase of the circuit breaker when the circuit breaker is subjected to an opening operation at least once;
opening the circuit breaker in a same interrupting phase based on the held information; and
closing the circuit breaker based on the interrupting phase.

16. A magnetizing inrush current suppression method that suppresses a magnetizing inrush current generated when there is closed a circuit breaker to open and close a connection between a single-phase alternating-current power system and a transformer that converts a three-phase alternating-current voltage to a single-phase alternating-current voltage, the method comprising:
- measuring the single-phase alternating-current voltage on the transformer side of the circuit breaker;
- calculating a residual magnetic flux of each phase of the transformer after the transformer is disconnected by the circuit breaker, based on the measured transformer side single-phase alternating-current voltage;
- measuring the single-phase alternating-current voltage on the power system side of the circuit breaker;
- calculating a steady magnetic flux of each phase of the transformer based on the measured power system side single-phase alternating-current voltage;
- determining a phase in which a polarity of the calculated residual magnetic flux matches a polarity of the calculated steady magnetic flux in the each phase; and
- closing the circuit breaker in the determined phase.

17. The magnetizing inrush current suppression method according to claim 16, further comprising:
- holding information obtained by measuring the residual magnetic flux of the transformer and a interrupting phase of the circuit breaker when the circuit breaker is subjected to an opening operation at least once;
- opening the circuit breaker in a same interrupting phase based on the held information; and
- closing the circuit breaker based on the interrupting phase.

18. A magnetizing inrush current suppression method that suppresses a magnetizing inrush current generated when there is closed a circuit breaker to open and close a connection between a single-phase alternating-current power system and a transformer that converts a three-phase alternating-current voltage to a single-phase alternating-current voltage, the method comprising:
- measuring the three-phase alternating-current voltage of the transformer;
- converting the measured three-phase alternating-current voltage of the transformer to the single-phase alternating-current voltage of the transformer;
- calculating a residual magnetic flux of each phase of the transformer after the transformer is disconnected by the circuit breaker, based on the converted single-phase alternating-current voltage;
- measuring the single-phase alternating-current voltage on the power system side of the circuit breaker;
- calculating a steady magnetic flux of each phase of the transformer based on the measured power system side single-phase alternating-current voltage;
- determining a phase in which a polarity of the calculated residual magnetic flux matches a polarity of the calculated steady magnetic flux in the each phase; and
- closing the circuit breaker in the determined phase.

* * * * *